(12) United States Patent
Yamakaji et al.

(10) Patent No.: US 10,938,035 B2
(45) Date of Patent: Mar. 2, 2021

(54) MANUFACTURING METHOD OF ELECTRODE FOR SECONDARY BATTERY

(71) Applicant: SEMICONDUCTOR ENERGY LABORATORY CO., LTD., Atsugi (JP)

(72) Inventors: Masaki Yamakaji, Kanagawa (JP); Kuniharu Nomoto, Saitama (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 195 days.

(21) Appl. No.: 16/001,467

(22) Filed: Jun. 6, 2018

(65) Prior Publication Data
US 2018/0287160 A1 Oct. 4, 2018

Related U.S. Application Data

(62) Division of application No. 13/724,427, filed on Dec. 21, 2012, now abandoned.

(51) Int. Cl.
*H01M 4/134* (2010.01)
*H01M 4/136* (2010.01)
(Continued)

(52) U.S. Cl.
CPC .......... *H01M 4/625* (2013.01); *H01M 4/134* (2013.01); *H01M 4/136* (2013.01);
(Continued)

(58) Field of Classification Search
None
See application file for complete search history.

(56) References Cited

U.S. PATENT DOCUMENTS 5,589,297 A 12/1996 Koga et al.
7,179,561 B2 2/2007 Niu et al.
(Continued)

FOREIGN PATENT DOCUMENTS

CN 101243566 A 8/2008
CN 101710619 A 5/2010
(Continued)

OTHER PUBLICATIONS

Kang.B et al., "Battery Materials for Ultrafast Charging and Discharging", Nature, Mar. 12, 2009, vol. 458, No. 7235, pp. 190-193.
(Continued)

*Primary Examiner* — Haroon S. Sheikh
(74) *Attorney, Agent, or Firm* — Nixon Peabody LLP; Jeffrey L. Costellia

(57) ABSTRACT

The positive electrode active material layer includes a plurality of particles of a positive electrode active material and a reaction mixture where reduced graphene oxide is bonded to a polymer having a functional group as a side chain. The reduced graphene oxide has a sheet-like shape and high conductivity and thus functions as a conductive additive by being in contact with the plurality of particles of the positive electrode active material. The reaction mixture serves as an excellent binder since the reduced graphene oxide is bonded to the polymer. Therefore, even a small amount of the reaction mixture where the reduced graphene oxide is covalently bonded to the polymer excellently serves as a conductive additive and a binder.

13 Claims, 15 Drawing Sheets

(51) Int. Cl.

| | | |
|---|---|---|
| *H01M 4/1397* | (2010.01) | |
| *H01M 4/62* | (2006.01) | |
| *H01M 4/04* | (2006.01) | |
| *H01M 4/58* | (2010.01) | |

(52) U.S. Cl.
CPC ......... *H01M 4/1397* (2013.01); *H01M 4/622* (2013.01); *H01M 4/0404* (2013.01); *H01M 4/5825* (2013.01)

(56) References Cited

U.S. PATENT DOCUMENTS

| | | | |
|---|---|---|---|
| 7,745,047 B2 | 6/2010 | Zhamu et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,003,257 B2 | 8/2011 | Takeuchi et al. | |
| 8,053,113 B2 | 11/2011 | Oh et al. | |
| 8,278,011 B2 | 10/2012 | Zhu et al. | |
| 8,586,239 B2 | 11/2013 | Sakamoto | |
| 8,652,687 B2 | 2/2014 | Zhamu et al. | |
| 9,318,231 B2 | 4/2016 | Ku et al. | |
| 2005/0186378 A1 | 8/2005 | Bhatt | |
| 2007/0131915 A1 | 6/2007 | Stankovich et al. | |
| 2007/0195488 A1 | 8/2007 | Kim et al. | |
| 2008/0254296 A1 | 10/2008 | Handa et al. | |
| 2009/0110627 A1 | 4/2009 | Choi et al. | |
| 2009/0117467 A1 | 5/2009 | Zhamu et al. | |
| 2010/0078591 A1 | 4/2010 | Sano et al. | |
| 2010/0081057 A1 | 4/2010 | Liu et al. | |
| 2010/0143798 A1 | 6/2010 | Zhamu et al. | |
| 2010/0176337 A1 | 7/2010 | Zhamu et al. | |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0308277 A1 | 12/2010 | Grupp | |
| 2010/0330421 A1 | 12/2010 | Cui et al. | |
| 2011/0012067 A1 | 1/2011 | Kay | |
| 2011/0020706 A1 | 1/2011 | Nesper | |
| 2011/0070146 A1 | 3/2011 | Song et al. | |
| 2011/0111303 A1 | 5/2011 | Kung et al. | |
| 2011/0121240 A1 | 5/2011 | Amine et al. | |
| 2011/0159372 A1 | 6/2011 | Zhamu et al. | |
| 2011/0229795 A1 | 9/2011 | Niu et al. | |
| 2011/0269016 A1 | 11/2011 | Takeuchi et al. | |
| 2012/0045692 A1 | 2/2012 | Takemura et al. | |
| 2012/0088151 A1 | 4/2012 | Yamazaki et al. | |
| 2012/0171574 A1* | 7/2012 | Zhamu ................. | H01M 4/364 429/300 |
| 2012/0328951 A1 | 12/2012 | Hirohashi et al. | |
| 2012/0328953 A1 | 12/2012 | Hirohashi et al. | |
| 2012/0328956 A1 | 12/2012 | Oguni et al. | |
| 2014/0329003 A1 | 11/2014 | Fouda Onana et al. | |

FOREIGN PATENT DOCUMENTS

| | | |
|---|---|---|
| CN | 102077392 A | 5/2011 |
| JP | 06-060870 A | 3/1994 |
| JP | 11-025983 A | 1/1999 |
| JP | 2000-277146 A | 10/2000 |
| JP | 2004-335188 A | 11/2004 |
| JP | 2006-265751 A | 10/2006 |
| JP | 2007-042620 A | 2/2007 |
| JP | 2009-524567 | 7/2009 |
| JP | 2009-176721 A | 8/2009 |
| JP | 2010-108703 A | 5/2010 |
| JP | 2011-503804 | 1/2011 |
| JP | 2011-029184 A | 2/2011 |
| JP | 2011-048992 A | 3/2011 |
| JP | 2011-076931 A | 4/2011 |
| JP | 2011-517053 | 5/2011 |
| KR | 10-1093140 | 12/2011 |
| WO | WO-2006/062947 | 6/2006 |
| WO | WO-2007/004728 | 1/2007 |
| WO | WO-2007/029934 | 3/2007 |
| WO | WO-2007/061945 | 5/2007 |
| WO | WO-2009/061685 | 5/2009 |
| WO | WO-2009/127901 | 10/2009 |
| WO | WO-2009/144600 | 12/2009 |
| WO | WO-2011/079238 | 6/2011 |
| WO | WO-2013/092446 | 6/2013 |

OTHER PUBLICATIONS

Zhou.F et al., "The Li intercalation potential of LiMPO4 and LiMSiO4 olivines with M = Fe, Mn, Co, Ni", Electrochemistry Communications, Nov. 1, 2004, vol. 6, No. 11, pp. 1144-1148.

Blake.P. et al., "Graphene-Based Liquid Crystal Device", Nano Letters, Apr. 30, 2008, vol. 8, No. 6, pp. 1704-1708.

Zhou.X et al., "Graphene modified LiFePO4 cathode materials for high power lithium ion batteries", J. Mater. Chem. (Journal of Materials Chemistry), 2011, vol. 21, pp. 3353-3358.

Park.S et al., "Graphene Oxide Sheets Chemically Cross-Linked by Polyallylamine", J. Phys. Chem. C (Journal of Physical Chemistry C), Aug. 6, 2009, vol. 113, No. 36, pp. 15801-15804.

Zhao.X et al., "In-Plane Vacancy-Enabled High-Power Si-Graphene Composite Electrode for Lithium-Ion Batteries", Advanced Energy Materials, 2011, vol. 1, pp. 1079-1084.

Takamura.T et al., "Identification of Nano-Sized Holes by TEM in the Graphene Layer of Graphite and the High Rate Discharge Capability of Li-Ion Battery Anodes", Electrochemica Acta, 2007, vol. 53, pp. 1055-1061.

Su.F et al., "Flexible and planar graphene conductive additives for lithium-ion batteries", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors", Nano Letters, 2011, vol. 11, No. 7, pp. 2905-2911.

Chinese Office Action (Application No. 201210571579.8) dated Jan. 26, 2016.

* cited by examiner

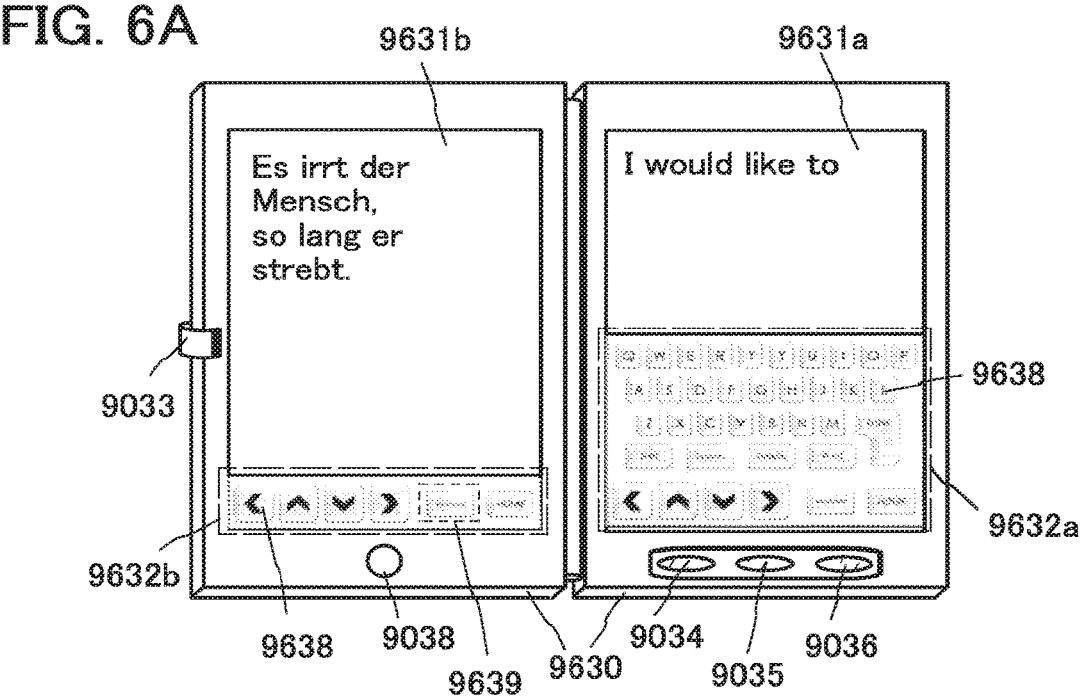
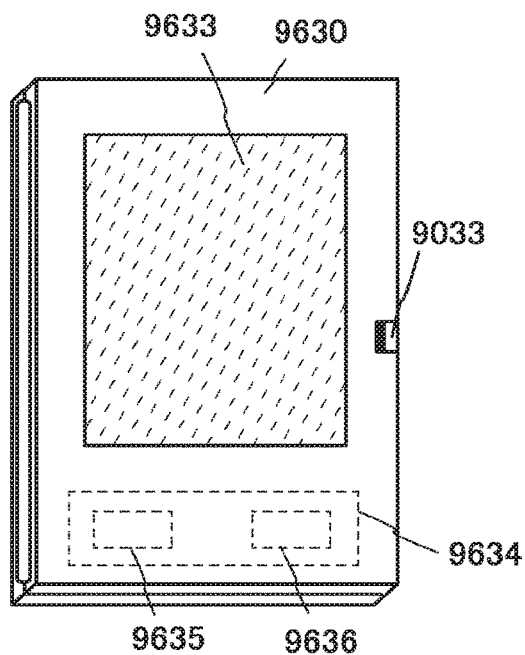
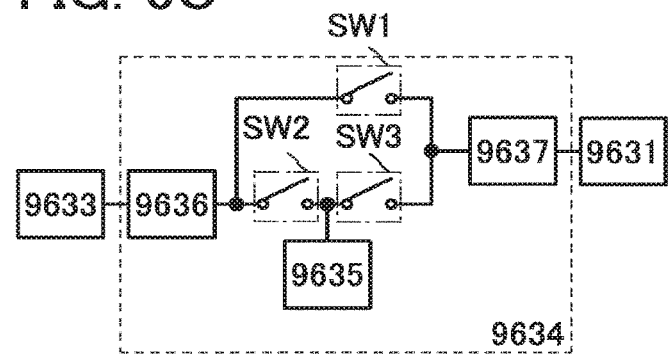

MANUFACTURING METHOD OF ELECTRODE FOR SECONDARY BATTERY

BACKGROUND OF THE INVENTION

1. Field of the Invention

The present invention relates to a positive electrode for a secondary battery and a manufacturing method thereof.

2. Description of the Related Art

In recent years, portable devices such as smartphones and portable game consoles have become widespread. Further, with growing interest in environmental issues, hybrid cars and electric cars have attracted attention; thus, secondary batteries typified by lithium secondary batteries have gained in importance.

A secondary battery basically has a structure in which an electrolyte is provided between a positive electrode and a negative electrode. Typically, a positive electrode and a negative electrode each include a current collector and an active material provided over the current collector. In the case of a lithium secondary battery, a material into/from which lithium ions can be inserted and extracted is used as an active material for a positive electrode and a negative electrode.

In most cases, a positive electrode active material is particulate to have a large contact area with an electrolyte. Thus, in general, a binder, a conductive additive, and the like are mixed with particles of a positive electrode active material to form a positive electrode active material layer and the positive electrode active material layer is provided over a current collector, whereby a positive electrode is formed.

A binder bonds particles of a positive electrode active material together and bonds the positive electrode active material and a current collector together to increase the strength of a positive electrode active material layer. Typical examples of a material of a binder are polyvinylidene difluoride (PVDF), styrene-butadiene rubber (SBR), and carboxymethylcellulose (CMC). A conductive additive provides an electrons supply path to a positive electrode active material and thus reduces the contact resistance between the positive electrode active material and a current collector. A typical example of a material of a conductive additive is acetylene black.

However, a binder, a conductive additive, and the like do not contribute to a battery reaction (insertion and extraction of lithium ions into/from an electrode in the case of a lithium secondary battery). Therefore, as the mixing proportions of a binder, a conductive additive, and the like increase, the proportion of a positive electrode active material in a positive electrode active material layer decreases, leading to a reduction in capacity per unit volume of the positive electrode active material layer.

For example, Patent Document 1 discloses a lithium secondary battery including carbon black as a conductive additive and a mixture of polyvinylidene difluoride and polyamideimide as a binder. In the lithium secondary battery, the proportion of a positive electrode active material in a positive electrode mixture (Positive electrode active material layer) is only 87 wt %.

REFERENCE

[Patent Document 1] Japanese Published Patent Application No. 2004-335188

SUMMARY OF THE INVENTION

In view of the above, an object of one embodiment of the present invention is to increase the proportion of a positive electrode active material in a positive electrode active material layer and the strength of the positive electrode active material layer. Further, another object is to increase the capacity per unit volume of a secondary battery.

For the purpose of achievement of the above object, one embodiment of the present invention focuses on the use of a reaction mixture where reduced graphene oxide and a polymer having a functional group are bonded to each other, for a conductive additive and a binder. Specifically, a positive electrode active material, graphene oxide, a polymer having a functional group as a side chain are mixed, and the graphene oxide and the polymer are bonded to each other. After that, the graphene oxide is reduced. The obtained reaction mixture where the reduced graphene oxide and the polymer are bonded to each other is used for a conductive additive and a binder.

In this specification, graphene refers to a one-atom-thick sheet of carbon molecules with holes through which ions of lithium or the like can pass and having $\pi$ bonds, or a stack of 2 to 100 one-atom-thick sheets thereof. Note that the stack can also be referred to as multilayer graphene.

Further, graphene oxide in this specification refers to oxidized graphene, that is, a substance where an oxygen atom is bonded to a carbon atom in graphene. More specifically, the graphene oxide in this specification refers to a substance where an epoxy group, a carbonyl group, a carboxyl group, a hydroxyl group, or the like is bonded to a carbon atom in a poly-membered ring such as a six-membered ring of graphene. Note that the graphene oxide in this specification is defined as one containing C=C bonds whose proportion with respect to the total number of the C=C bonds, C—C bonds, C—H bonds, C—O bonds, C=O bonds, and O=C—O bonds is less than 5%, for the sake of discrimination between the graphene oxide and reduced graphene oxide which is to be described later. Further, in the graphene oxide in this specification, the proportion of oxygen atoms with respect to the total number of carbon atoms, the oxygen atoms, and nitrogen atoms is greater than 15 at. %.

Reduced graphene oxide in this specification is formed by reducing graphene oxide. Thus, the reduced graphene oxide can also be referred to as graphene oxide reduced to have $\pi$ bonds of carbon atoms (in other words, $sp^2$ orbitals derived from the C=C bond). More specifically, the reduced graphene oxide can also be referred to as graphene oxide in which the proportion of C=C bonds with respect to the total number of the C=C bonds, C—C bonds, C—H bonds, C—O bonds, C=O bonds, and O=C—O bonds is greater than or equal to 5%.

Further, the reduced graphene oxide can also be referred to as graphene oxide reduced to contain a decreased proportion of oxygen. The reduced graphene oxide can also be referred to as graphene oxide in which the proportion of oxygen atoms with respect to the total number of carbon atoms, the oxygen atoms, and nitrogen atoms is greater than or equal to 1 at. % and less than or equal to 15 at. %.

Further, the reduced graphene oxide can also be referred to as graphene oxide reduced to have increased conductivity due to formation of $\pi$ bonds of carbon atoms. Therefore, the reduced graphene oxide can also be referred to as graphene oxide whose electric conductivity is higher than or equal to $10^{-6}$ S/m.

One embodiment of the present invention is a positive electrode for a secondary battery. In the positive electrode, a positive electrode active material layer is provided over a current collector. The positive electrode active material layer includes a plurality of particles of a positive electrode active material and a reaction mixture where at least one of reduced graphene oxide and reduced multilayer graphene oxide and a polymer having a functional group as a side chain are bonded to each other. The plurality of particles of the positive electrode active material and the reduced graphene oxide are at least partly in contact with each other.

An amino group is preferably included as the functional group.

The bonds preferably include a covalent bond between a carbon atom and a nitrogen atom.

An anchor coat layer is preferably provided between the current collector and the positive electrode active material layer.

The anchor coat layer preferably includes a mixture of one or more of polyvinylidene difluoride, polyimide, carboxymethyl cellulose, and sodium polyacrylate and one or more of acetylene black, carbon black, graphene, reduced graphene oxide, and a carbon nanotube.

Another embodiment of the present invention is a manufacturing method of a positive electrode for a secondary battery. The manufacturing method includes the steps of mixing a plurality of particles of a positive electrode active material, graphene oxide, and water; adding a polymer aqueous solution to the mixture of the plurality of particles of the positive electrode active material, the graphene oxide, and the water to form a slurry; applying the slurry to a current collector; drying the slurry to form a positive electrode active material layer; and reducing the graphene oxide in the positive electrode active material layer.

It is preferable that the graphene oxide in the positive electrode active material layer be reduced by supplying a potential at which the reduction reaction of the graphene oxide occurs to the current collector in an electrolyte in which the current collector and a counter electrode are immersed.

Before the application of the slurry to the current collector, surface treatment is preferably performed on the current collector.

According to one embodiment of the present invention, it is possible to increase the proportion of a positive electrode active material in a positive electrode active material layer and the strength of the positive electrode active material layer. Further, the capacity per unit volume of a secondary battery can be increased.

BRIEF DESCRIPTION OF THE DRAWINGS

In the accompanying drawings:

FIGS. 6A to 6C illustrate an electronic device;

DETAILED DESCRIPTION OF THE INVENTION

Figure 1A:
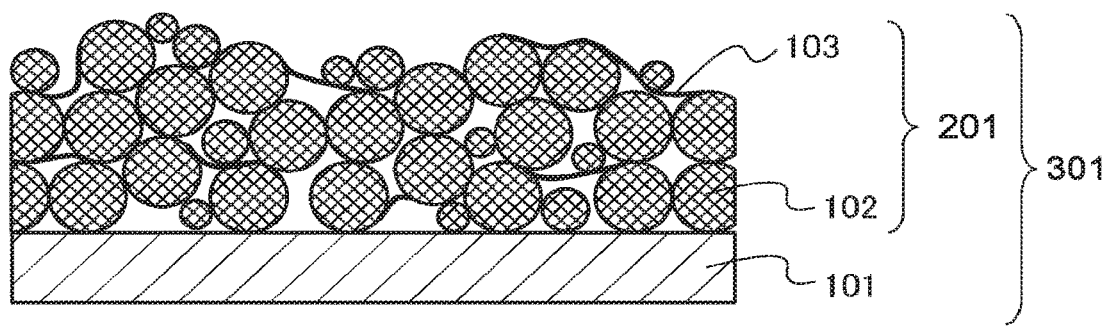
FIG. 1A is a cross-sectional view of a positive electrode of one embodiment of the present invention.

Hereinafter, embodiments and examples will be described with reference to drawings. Note that the embodiments and examples can be implemented in various modes. It will be readily appreciated by those skilled in the art that modes and details can be changed in various ways without departing from the spirit and scope of the present invention. Thus, the present invention should not be interpreted as being limited to the following descriptions of the embodiments and examples.

Note that the position, size, range, or the like of each structure illustrated in the drawings and the like is not accurately represented in some cases for simplicity. Therefore, the present invention is not necessarily limited to the position, size, range, or the like disclosed in the drawings and the like.

Embodiment 1

In this embodiment, an example of a positive electrode for a lithium secondary battery of one embodiment of the present invention will be described with reference to FIGS. 1A and 1B and FIG. 2.

Structure of Positive Electrode

Figure 1B:
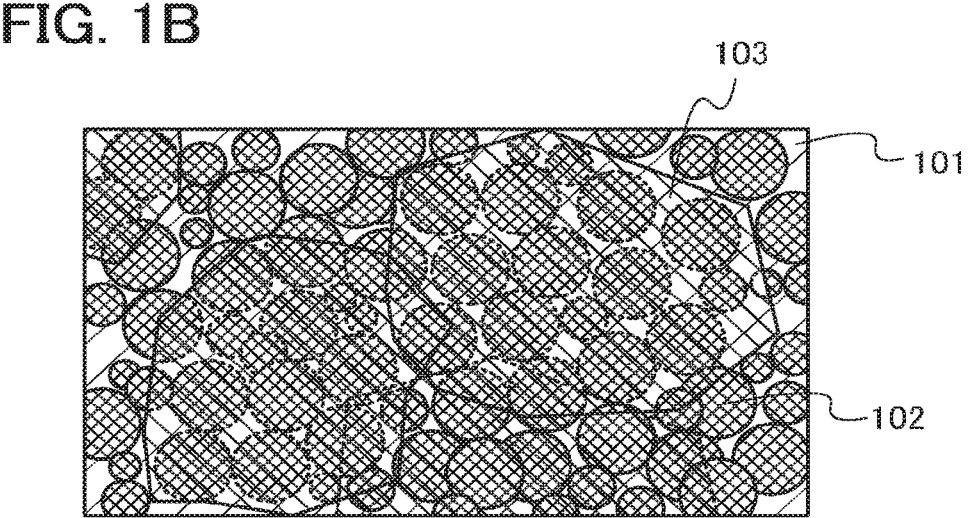
FIG. 1B is a top view thereof.

FIG. 1A is a cross-sectional view of an example of a positive electrode 301, and FIG. 1B is a top view thereof. In the positive electrode 301, a positive electrode active material layer 201 is provided over a current collector 101. The positive electrode active material layer 201 includes a positive electrode active material 102 and a reaction mixture 103 where reduced graphene oxide and a polymer having a functional group as a side chain are bonded to each other.

Binder

In the positive electrode 301, the reaction mixture 103 functions as a binder. As for the bond between the reduced graphene oxide and the polymer having the functional group as the side chain in the reaction mixture 103, a covalent bond is preferable because of its high bonding strength. Note that a polymer in this specification and the like refers to a compound formed by polymerization of a plurality of monomers, and the molecular weight and the degree of polymerization are not limited. As the polymer, an oligomer with a degree of polymerization of approximately 2 to 100 may be used.

As a functional group of the polymer having the functional group as the side chain, an amino group, a carboxy group, a carbonyl group, a hydroxy group, an azo group, a diazo group, a thiol group, or the like can be used. Alternatively, an azide may be used as a polymer having a functional group as a side chain.

Examples of a polymer having an amino group are polyarylamine, polyimide, and polyamideimide.

Figure 2:
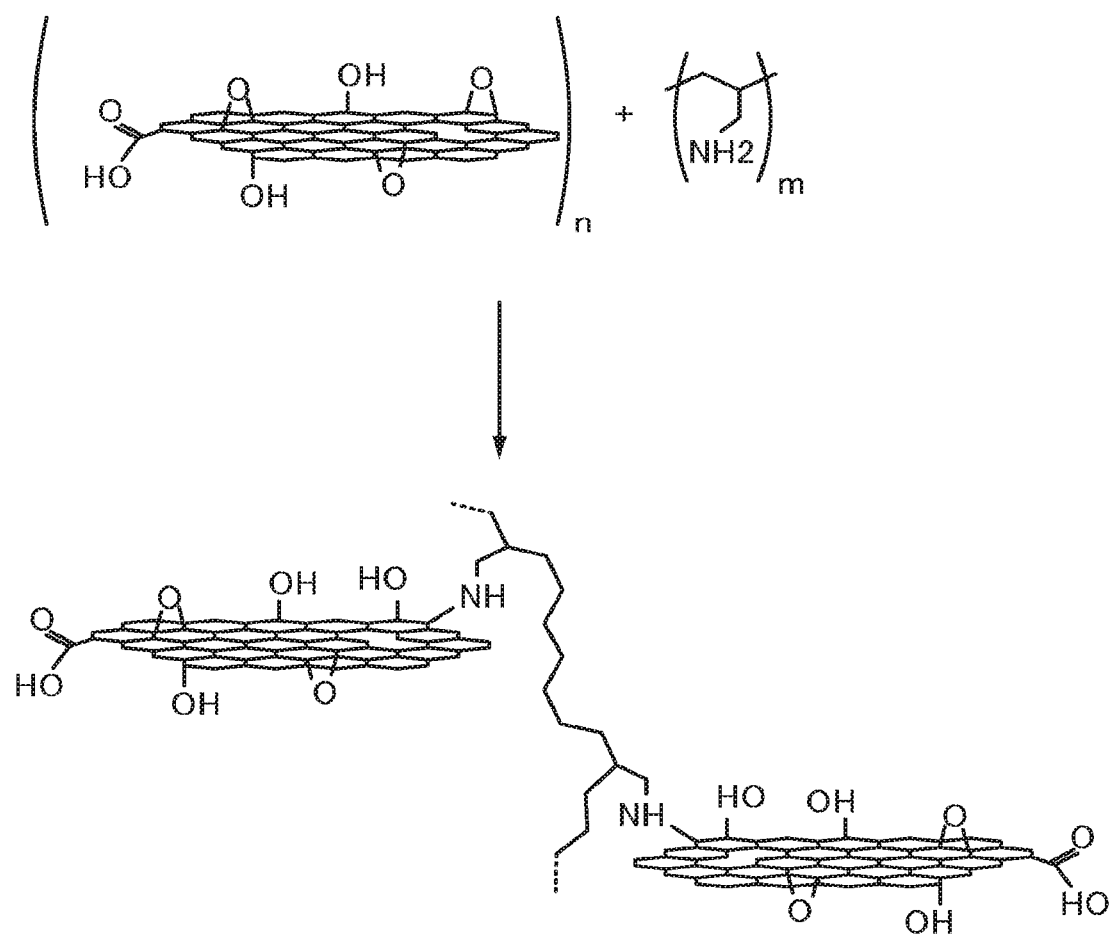
FIG. 2 illustrates an example of a bond between graphene oxide and a polymer in a positive electrode of one embodiment of the present invention.

In the case of using a polymer having an amino group, the covalent bond between the reduced graphene oxide and the polymer is a C—N bond (see FIG. 2). Thus, infrared absorption of a C—N bond in the reaction mixture 103 where reduced graphene oxide and a polymer having a functional group as a side chain are bonded to each other can be observed by measurement with a Fourier transform infrared (FT-IR) spectrometer. Further, nitrogen can be detected by an inductively coupled plasma (ICP) emission spectrochemical analysis, an X-ray fluorescence (XRF) analysis, or the like. Furthermore, a compound containing nitrogen can be detected by liquid chromatography-mass spectroscopy (LC-MS), gas chromatography-mass spectroscopy (GC-MS), or the like.

Regardless of the functional group of the polymer, a compound whose molecular weight is larger than each of those of the reduced graphene oxide and the polymer which have not been covalently bonded to each other yet can be detected by size exclusion chromatography (SEC).

Alternatively, a conductive polymer typified by a polymer having an oligothiophene skeleton may be used. It is preferable to use a conductive polymer because the conductivity of the positive electrode active material layer 201 can be further increased.

The reduced graphene oxide is formed by the reduction of graphene oxide. Specifically, in the reduced graphene oxide, the proportion of oxygen atoms with respect to the total number of carbon atoms, the oxygen atoms, and nitrogen atoms measured by X-ray photoelectron spectroscopy (XPS) or the like is greater than or equal to 1 at. % and less than or equal to 15 at. %. Alternatively, in the reduced graphene oxide, the proportion of C=C bonds with respect to the total number of the C=C bonds, C—C bonds, C—H bonds, C—O bonds, C=O bonds, and O=C—O bonds measured by XPS or the like is greater than or equal to 5%, preferably greater than or equal to 10%, more preferably greater than or equal to 30%. Still alternatively, the electric conductivity of the reduced graphene oxide is higher than or equal to $10^{-6}$ S/m.

Graphene oxide has a functional group such as an epoxy group, a carboxy group, a carbonyl group, or a hydroxyl group and thus can be bonded through the functional group to the polymer having the functional group as the side chain. By performing reduction treatment on a reaction mixture where graphene oxide and a polymer having a functional group as a side chain are bonded to each other, a reaction mixture where reduced graphene oxide and the polymer having the functional group as a side chain are bonded to each other can be obtained. The reduction of graphene oxide to form reduced graphene oxide allows the electric conductivity to be increased. Therefore, even a small amount of the reaction mixture 103 where reduced graphene oxide and a polymer having a functional group as a side chain are bonded to each other can excellently serve as a conductive additive and a binder.

Positive Electrode Active Material

As the positive electrode active material, a compound such as $LiFeO_2$, $LiCoO_2$, $LiNiO_2$, or $LiMn_2O_4$, or $V_2O_5$, $Cr_2O_5$, or $MnO_2$ can be used.

Alternatively, an olivine-type lithium-containing composite oxide ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a lithium-containing composite oxide such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

In the case where carrier ions are alkali metal ions other than lithium ions, alkaline-earth metal ions, beryllium ions, or magnesium ions, the following may be used as the positive electrode active material: a compound or a composite oxide which is obtained by substituting an alkali metal (e.g., sodium or potassium), an alkaline-earth metal (e.g., calcium, strontium, or barium), beryllium, or magnesium for lithium in the lithium compound or the lithium-containing composite oxide.

In particular, $LiFePO_4$ is preferably used because of its advantages of containing very inexpensive iron, having a high potential (approximately 3.5 V) for a material which involves $Fe^{2+}/Fe^{3+}$ reduction-oxidation, having favorable cycle characteristics, having higher energy density because of its theoretical capacity of approximately 170 $mAhg^{-1}$, and the like.

Current Collector

As the current collector, a material having high conductivity such as aluminum or stainless steel can be used. In particular, aluminum is preferable because it is passivated and thus a chemically stable electrode can be formed. In addition, the current collector can have a foil shape, a plate shape, a net shape, or the like as appropriate.

Embodiment 2

In this embodiment, an example of a method for manufacturing a positive electrode for a lithium secondary battery of one embodiment of the present invention will be described.

Graphene Oxide

First, a method for forming graphene oxide will be described. Graphene oxide can be formed by an oxidation method called a modified Hummers method. A modified Hummers method is as follows: a sulfuric acid solution of potassium permanganate, hydrogen peroxide water, or the like is mixed into single crystal graphite powder to cause oxidation reaction; thus, a suspension containing graphite oxide is formed. Then, the graphite oxide is cleaved to form a dispersion containing graphene. The graphite oxide has a functional group such as an epoxy group, a carbonyl group, a carboxyl group, or a hydroxy group due to the oxidation of carbon in graphite. By transmitting ultrasonic vibration to the suspension containing graphite oxide, the graphene oxide whose interlayer distance is long can be cleaved to separate graphene oxide and to form a dispersion containing graphene oxide.

The graphene oxide obtained by cleaving the graphite oxide also has a functional group such as an epoxy group, a carbonyl group, a carboxyl group, or a hydroxy group. Since the graphene oxide has such a functional group, the interlayer distance between adjacent graphenes of a plurality of graphenes is longer than the interlayer distance in graphite. Note that a method for forming graphene oxide other than a modified Hummers method may be employed as appropriate. After that, a solvent is removed from the dispersion containing graphene oxide, so that graphene oxide can be formed.

In a solution having a polarity, different graphene oxides are not easily aggregated because the functional groups included in the graphene oxides are electrically charged. Accordingly, in a solution having a polarity graphene oxides are likely to disperse uniformly.

The length of one side (also referred to as a flake size) of graphene oxide which is used is preferably several micrometers to several tens of micrometers.

Note that for graphene oxide, commercial graphene oxide or a commercial graphene oxide dispersion may be used.

Positive Electrode Active Material

Next, a manufacturing method of a positive electrode active material will be described. First, the following compounds are mixed at a predetermined composition ratio to form a mixed material: a compound containing lithium, which is a supply source of Li of a $LiMePO_4$ (general formula) (note that Me represents manganese (Mn) or iron (Fe)); a compound containing phosphorus, which is a supply source of P of the $LiMePO_4$; and a compound containing iron or manganese, which is a supply source of Me of the $LiMePO_4$.

As the compound including lithium, for example, lithium salt such as lithium carbonate ($Li_2CO_3$), lithium oxide ($Li_2O$), lithium sulfide ($Li_2S$), lithium peroxide ($Li_2O_2$), lithium sulfate ($Li_2SO_4$), lithium sulfite ($Li_2SO_3$), lithium thiosulfate ($Li_2S_2O_3$), lithium chromate ($Li_2CrO_4$), or lithium dichromate ($Li_2Cr_2O_7$) can be used.

As the compound including manganese, for example, manganese oxide, manganese (II) oxalate dihydrate, or manganese (II) carbonate can be used. When such a compound including manganese is used for a mixed material, an electrode material including lithium manganese phosphate can be manufactured. As the compound including iron, for example, iron oxide, iron (II) oxalate dihydrate, or iron (II) carbonate can be used. When such a compound including iron is used for a mixed material, an electrode material including lithium iron phosphate can be manufactured.

Note that cobalt (Co) or Nickel (Ni) may be used as Me in the lithium phosphate compound represented by the general formula $LiMePO_4$. As a compound including cobalt or nickel, an oxide of cobalt or nickel (cobalt oxide or nickel oxide), an oxalate (cobalt oxalate or nickel oxalate), a carbonate (cobalt carbonate or nickel carbonate), or the like can be used.

As the compound including phosphorus, for example, a phosphate such as ammonium dihydrogen phosphate ($NH_4H_2PO_4$) or diphosphorus pentoxide ($P_2O_5$) can be used.

As a method for mixing the above compounds, for example, ball mill treatment can be used. Specifically, in the method, for example, a highly volatile solvent such as acetone is added to the compounds each of which is weighed, and the treatment is performed using a metal or ceramic ball (with a ball radius of ϕ1 mm or more and 10 mm or less) with a revolution number of 50 rpm or more and 500 rpm or less for a revolution time of 30 minutes or more and 5 hours or less. With ball mill treatment, the compounds can be mixed and formed into minute particles, so that the electrode material that is to be manufactured can be minute particles. In addition, with ball mill treatment, the compounds which are raw materials can be uniformly mixed, leading to improvement in crystallinity of the electrode material that is to be manufactured. Note that other than acetone, a solvent in which the raw materials are not dissolved, such as ethanol or methanol, may be used.

Then, after heating the mixed material and evaporating the solvent, first heat treatment (pre-baking) is performed. The first heat treatment may be performed at a temperature of higher than or equal to 300° C. and lower than or equal to 400° C. for longer than or equal to 1 hour and shorter than or equal to 20 hours, preferably shorter than or equal to 10 hours. When the temperature of the first heat treatment (pre-baking) is too high, the particle size of a positive electrode active material becomes too large and thus a property of a battery is degraded in some cases. However, when the first heat treatment (pre-baking) is performed at a low temperature of higher than or equal to 300° C. and lower than or equal to 400° C., a crystal nucleus can be formed with crystal growth suppressed. Therefore, the electrode material can be formed into minute particles.

The first heat treatment is preferably performed in a hydrogen atmosphere, or an inert gas atmosphere of a rare gas (such as helium, neon, argon, or xenon) or nitrogen.

After the first heat treatment, a washing step is performed on the baked product. As a washing solution, a neutral or alkaline washing solution such as pure water or an alkalescent solution (e.g., a sodium hydroxide solution with a pH of approximately 9.0) can be used. For example, after washing at room temperature for an hour, the solution may be filtrated to collect the baked product.

By washing the baked product, impurities included therein can be reduced, so that a highly purified lithium phosphate compound can be formed. The highly purified lithium phosphate compound in which the impurity concentration is reduced has improved crystallinity, which makes it possible to increase the number of carrier ions which are intercalated and deintercalated in charging and discharging.

Next, the washed material is ground in a mortar or the like, and mixing is performed with ball mill treatment in a manner similar to that of the above. Then, after heating the mixed material and evaporating a solvent, second heat treatment (main-baking) is performed.

The second heat treatment may be performed at a temperature of greater than or equal to 500° C., and less than or equal to 800° C. (preferably about 600° C.) for longer than or equal to 1 hour and shorter than or equal to 20 hours (preferably shorter than or equal to 10 hours). The temperature of the second heat treatment is preferably higher than the temperature of the first heat treatment.

Through the above process, the lithium phosphate compound that can be used as the electrode material can be manufactured.

Positive Electrode Active Material Layer

Next, the positive electrode active material formed in the above manner, graphene oxide, and a polymer having a functional group as a side chain are weighed.

The weight proportion of the positive electrode active material with respect to total weight of the positive electrode active material, the graphene oxide, and the polymer having the functional group as a side chain is preferably as high as possible as long as enough conductivity and enough strength of the electrode can be secured. Specifically, the proportion of the graphene oxide is preferably greater than or equal to 1 wt. % and less than or equal to 20 wt. %, more preferably greater than or equal to 2 wt. % and less than or equal to 3 wt. %. Setting the proportion of the graphene oxide to greater than or equal to 1 wt. % leads to a reduction in contact resistance between the positive electrode active materials and between the positive electrode active material and a current collector, resulting in an increase in conductivity. Further, setting the proportion of the graphene oxide to less than or equal to 20 wt. % allows the positive electrode to have a high capacity per unit volume of a positive electrode active material layer.

Then, the positive electrode active material and the graphene oxide are mixed. In this embodiment, water is added and wet mixing is performed using a rotary and revolutionary mixer.

After that, the polymer having the functional group as a side chain is added to the mixture of the positive electrode active material and the graphene oxide to form a slurry. In this embodiment, water is added to the polymer having the functional group as a side chain and this aqueous solution is mixed into the mixture of the positive electrode active material and the graphene oxide, so that a slurry is formed.

Note that heating, addition of a catalyst, or the like is performed as necessary for the reaction between the graphene oxide and the polymer having the functional group as a side chain.

Then, the slurry is applied to a current collector and dried, whereby the positive electrode active material layer is formed over the current collector. In this embodiment, the slurry is applied to a current collector made of aluminum foil and dried at 50° C., so that the positive electrode active material layer is formed over the current collector.

Note that an anchor coat layer may be provided over the current collector before the positive electrode active material layer is formed over the current collector. For the anchor coat layer, a mixture of a polymer and a conductive additive can be used, for example. Here, as the polymer, one or more of polyvinylidene difluoride, polyimide, carboxymethyl cellulose, and sodium polyacrylate can be used. As the conductive additive, one or more of acetylene black, carbon black, graphene, reduced graphene oxide, and a carbon nanotube can be used. The polymer in the anchor coat layer helps improve adhesion between the current collector and the positive electrode active material layer, and the conductive additive in the anchor coat layer helps reduce contact resistance between the current collector and the positive electrode active material layer.

Instead of providing an anchor coat layer, surface treatment may be performed on the current collector before the positive electrode active material layer is formed over the current collector. Examples of the surface treatment are etching and plating. The surface treatment allows a surface of the current collector to have a complex shape such as an uneven shape; thus, adhesion between the current collector and the positive electrode active material layer can be increased. The increase in adhesion between the current collector and the positive electrode active material layer leads to an increase in strength of the positive electrode.

Then, the graphene oxide in the positive electrode active material layer is reduced to form reduced graphene oxide. As a reduction method, thermal reduction treatment, electrochemical reduction treatment, the combination of thermal reduction treatment and electrochemical reduction treatment, or the like can be employed.

In the case of employing thermal reduction treatment, the graphene oxide can be reduced by baking using an oven or the like.

In the case of employing electrochemical reduction treatment, a closed circuit is formed with the use of the current collector and the positive electrode active material layer, and a potential at which the reduction reaction of the graphene oxide occurs or a potential at which the graphene oxide is reduced is supplied to the positive electrode active material layer, so that the graphene oxide is reduced to form graphene. Note that in this specification, a potential at which the reduction reaction of the graphene oxide occurs or a potential at which the graphene oxide is reduced is referred to as the reduction potential.

Specifically, reduction treatment is performed as follows. First, a container is filled with an electrolyte, and the positive electrode active material layer and a counter electrode are put in the container so as to be immersed in the electrolyte. An electrochemical cell (open circuit) is formed with the use of at least the counter electrode and the electrolyte besides the positive electrode active material layer as a working electrode, and the reduction potential of the graphene oxide is supplied to the positive electrode active material layer (working electrode), so that the graphene oxide is reduced to form reduced graphene oxide. Note that the reduction potential to be supplied is a reduction potential in the case where the potential of the counter electrode is used as a reference potential or a reduction potential in the case where a reference electrode is provided in the electrochemical cell and the potential of the reference electrode is used as a reference potential. For example, when the counter electrode and the reference electrode are each made of lithium metal, the reduction potential to be supplied is a reduction potential determined relative to the redox potential of the lithium metal (vs. $Li/Li^+$). Reduction current flows through the electrochemical cell (closed circuit) when the gaphene oxide is reduced. Thus, to examine whether the gaphene oxide is reduced, the reduction current needs to be checked continuously; the state where the reduction current is below a certain value (where there is no peak corresponding to the reduction current) is regarded as the state where the graphene oxide is reduced (where the reduction reaction is completed).

In controlling the potential of the positive electrode active material layer, the potential of the positive electrode active material layer may be fixed to the reduction potential of the graphene oxide or may be swept so as to include the reduction potential of the graphene oxide. Further, the sweeping may be repeated. Although there is no limitation on the sweep rate of the potential of the positive electrode active material layer, it is preferably higher than or equal to 0.005 mV/s and lower than or equal to 1 mV/s. Note that the potential of the positive electrode active material layer may be swept either from a higher potential to a lower potential or from a lower potential to a higher potential.

Although the reduction potential of the graphene oxide slightly varies depending on the structure of the graphene oxide (e.g., the presence or absence of a functional group) and the way to control the potential (e.g., the sweep rate), it is approximately 2.0 V (vs. $Li/Li^+$). Specifically, the potential of the positive electrode active material layer may be controlled so as to fall within the range of 1.6 V to 2.4 V (vs. $Li/Li^+$).

Through the above process, the graphene oxide in the positive electrode active material layer can be reduced and the positive electrode of one embodiment of the present invention can be formed.

Embodiment 3

In this embodiment, an example of a lithium secondary battery of one embodiment of the present invention and an example of a manufacturing method thereof will be described with reference to FIGS. 3A and 3B.

Figure 3A:
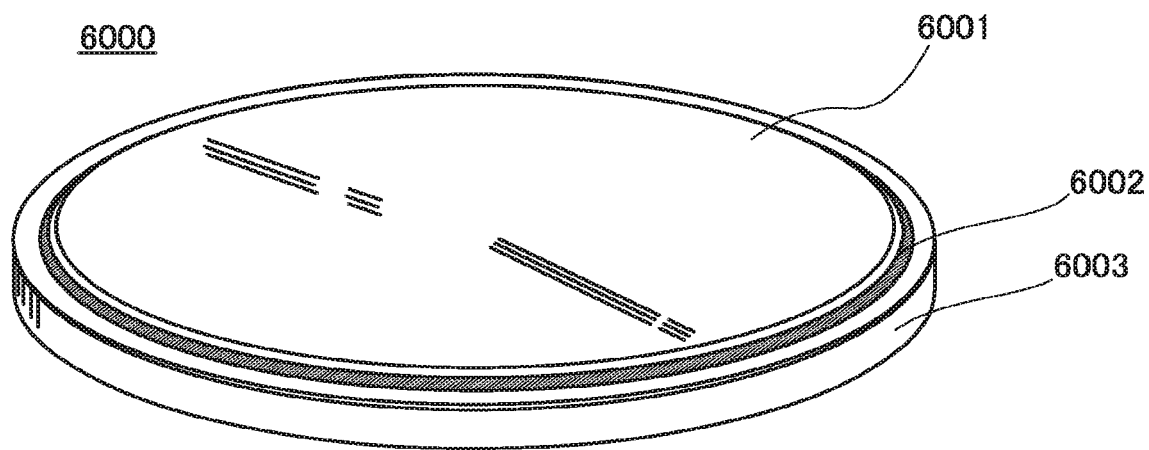
FIGS. 3A and 3B illustrate a coin-type lithium secondary battery.
Figure 3B:
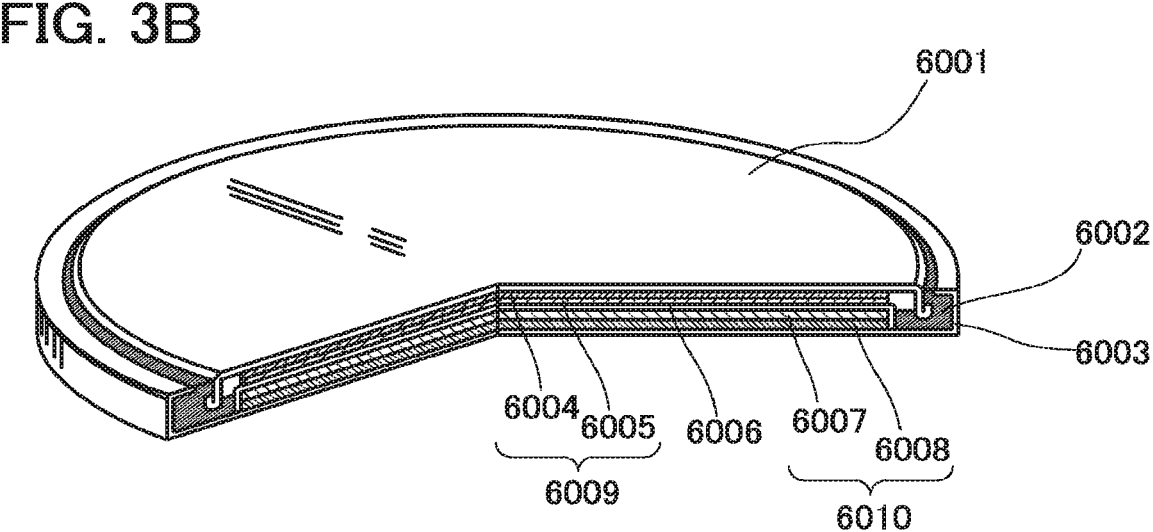

FIG. 3A is an external view of a coin-type (single-layer and flat) lithium secondary battery, and FIG. 3B is a cross-sectional view thereof.

In a coin-type lithium secondary battery 6000, a positive electrode can 6003 doubling as a positive electrode terminal and a negative electrode can 6001 doubling as a negative electrode terminal are insulated from each other and sealed by a gasket 6002 made of polypropylene or the like. As in the above description, a positive electrode 6010 includes a positive electrode current collector 6008 and a positive electrode active material layer 6007 provided in contact with the positive electrode current collector 6008. A negative electrode 6009 includes a negative electrode current collector 6004 and a negative electrode active material layer 6005 provided in contact with the negative electrode current collector 6004. A separator 6006 and an electrolyte (not illustrated) are provided between the positive electrode active material layer 6007 and the negative electrode active material layer 6005.

As the positive electrode 6010 and the positive electrode active material layer 6007, the positive electrode 301 and the positive electrode active material layer 201 described in Embodiment 1 can be used as appropriate, respectively.

For the negative electrode current collector 6004, a conductive material such as titanium, aluminum, or stainless steel which is processed into a foil shape, a plate shape, a net shape, or the like can be used. Alternatively, a conductive layer provided by deposition on a substrate and then separated from the substrate can be used as the negative electrode current collector 6004.

For the negative electrode active material layer 6005, a material into/from which lithium ions can be electrochemically inserted and extracted is used. For example, lithium, aluminum, a carbon-based material such as silicon carbide, tin, tin oxide, silicon, silicon oxide, a silicon alloy, germanium, or the like can be used. Alternatively, a compound containing one or more materials selected from lithium, aluminum, a carbon-based material such as silicon carbide, tin, tin oxide, silicon, silicon oxide, a silicon alloy, and germanium may be used. As the carbon-based material into/from which lithium ions can be inserted and extracted, a graphite powder, a graphite fiber, or graphite-based carbon can be used. Note that silicon, a silicon alloy, germanium, lithium, aluminum, and tin each have the ability to have large amounts of lithium-ion insertion as compared with carbon-based materials. Therefore, the negative electrode active material layer 6005 can be formed using a smaller amount of material, which enables reductions in cost and size of the lithium secondary battery 6000.

As the separator 6006, an insulator such as cellulose (paper), or polyethylene or polypropylene with pores can be used.

Note that in the case where a positive electrode provided with a spacer is used as the positive electrode 6010, the separator 6006 does not necessarily have to be provided.

As a solute of the electrolyte, a material which contains carrier ions is used. Typical examples of the solute of the electrolyte include lithium salts such as $LiClO_4$, $LiAsF_6$, $LiBF_4$, $LiPF_6$, and $Li(C_2F_5SO_2)_2N$.

Note that when carrier ions are alkali metal ions other than lithium ions, alkaline-earth metal ions, beryllium ions, or magnesium ions, instead of lithium in the above lithium salts, an alkali metal (e.g., sodium or potassium), an alkaline-earth metal (e.g., calcium, strontium, or barium), beryllium, or magnesium may be used for a solute of the electrolyte.

As a solvent of the electrolyte, a material in which carrier ions can transfer is used. As the solvent of the electrolyte, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolyte, safety against liquid leakage and the like is improved. Further, the lithium secondary battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolyte can prevent a secondary battery from exploding or catching fire even when the secondary battery internally shorts out or the internal temperature increases owing to overcharging or the like.

As the electrolyte, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator or a spacer is not necessary. Further, the battery can be entirely solidified; therefore, there is no possibility of liquid leakage and thus the safety of the battery is dramatically increased.

For the positive electrode can 6003 and the negative electrode can 6001, a corrosion-resistant metal such as nickel, aluminum, or titanium, an alloy of such a metal, or an alloy of such a metal and another metal (stainless steel or the like) can be used. It is particularly preferable to plate a corrosive metal with nickel or the like in order to prevent corrosion by the electrolyte, which occurs due to charge/discharge of the secondary battery. The positive electrode can 6003 and the negative electrode can 6001 are electrically connected to the positive electrode 6010 and the negative electrode 6009, respectively.

The negative electrode 6009, the positive electrode 6010, and the separator 6006 are immersed in the electrolyte. Then, as illustrated in FIG. 3B, the positive electrode 6010, the separator 6006, the negative electrode 6009, and the negative electrode can 6001 are stacked in this order with the positive electrode can 6003 positioned at the bottom, and the positive electrode can 6003 and the negative electrode can 6001 are subjected to pressure bonding with the gasket 6002 interposed therebetween. In such a manner, the coin-type lithium secondary battery 6000 is manufactured.

Figure 4A:
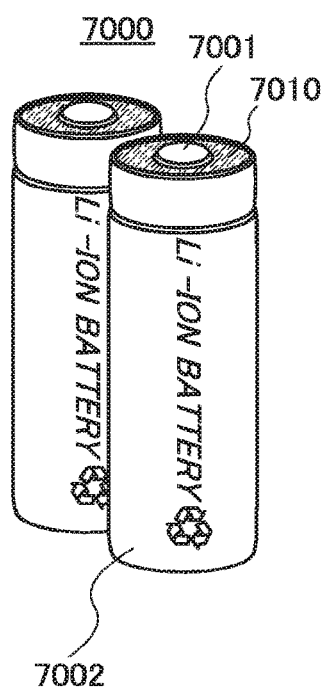
FIGS. 4A and 4B illustrate a cylindrical lithium secondary battery.

Next, a structure of a cylindrical lithium secondary battery will be described with reference to FIGS. 4A and 4B. As illustrated in FIG. 4A, a cylindrical lithium secondary battery 7000 includes a positive electrode cap (battery cap)

7001 on the top surface and a battery can (outer can) 7002 on the side surface and bottom surface. The positive electrode cap 7001 and the battery can 7002 are insulated from each other by a gasket 7010 (insulating gasket).

Figure 4B:
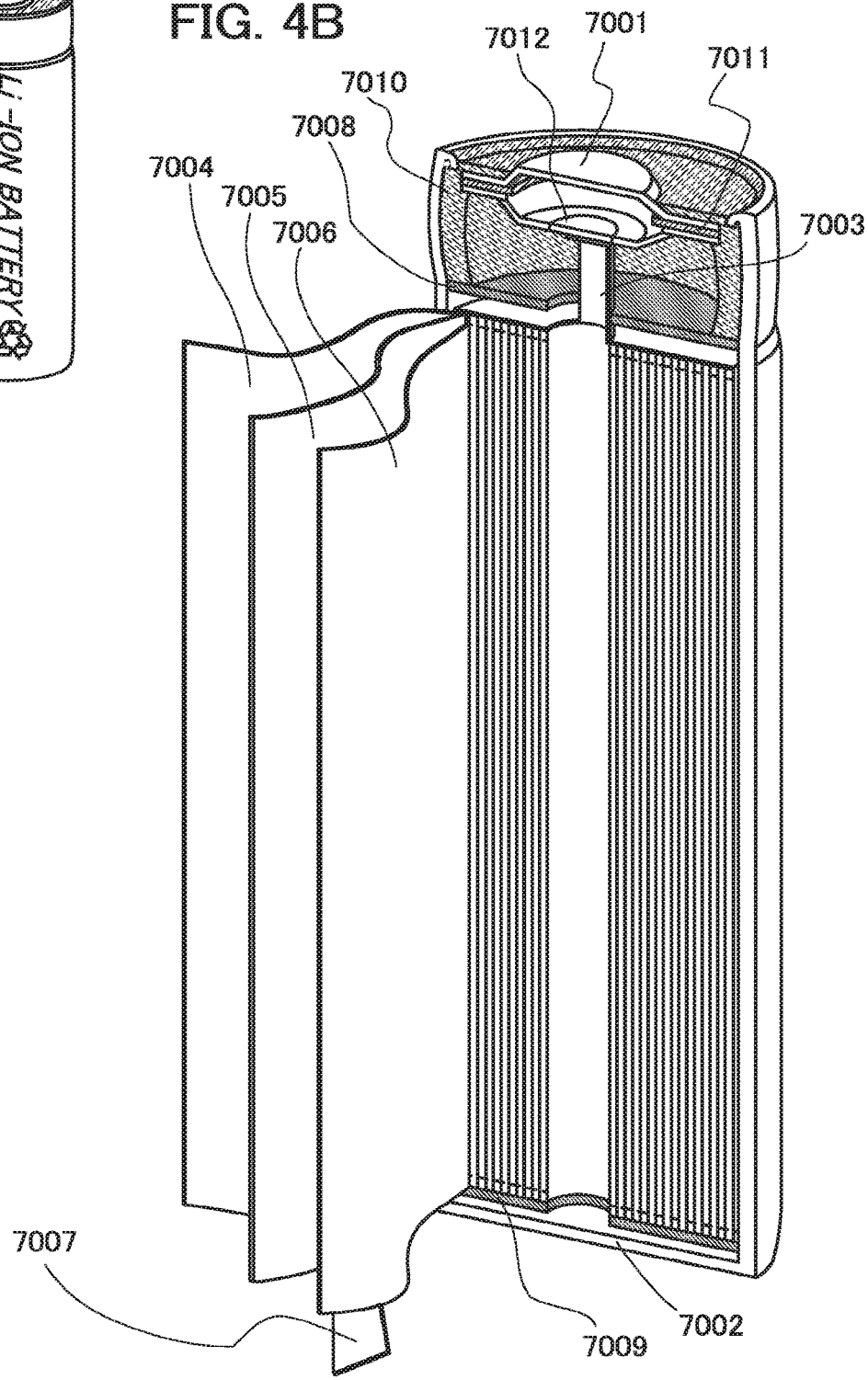

FIG. 4B is a diagram schematically illustrating a cross section of the cylindrical lithium secondary battery. Inside the battery can 7002 having a hollow cylindrical shape, a battery element in which a strip-like positive electrode 7004 and a strip-like negative electrode 7006 are wound with a stripe-like separator 7005 interposed therebetween is provided. Although not illustrated, the battery element is wound around a center pin. One end of the battery can 7002 is close and the other end thereof is open. A corrosion-resistant metal such as nickel, aluminum, or titanium, an alloy of such a metal, or an alloy of such a metal and another metal (stainless steel or the like) can be used for the battery can 7002. It is particularly preferable to plate a corrosive metal with nickel or the like in order to prevent corrosion by the electrolyte, which occurs due to charge/discharge of the secondary battery. Inside the battery can 7002, the battery element in which the positive electrode, the negative electrode, and the separator are wound is interposed between a pair of insulating plates 7008 and 7009 which face each other. Further, an electrolyte (not illustrated) is injected inside the battery can 7002 provided with the battery element. As the electrolyte, an electrolyte which is similar to that of the above coin-type lithium secondary battery can be used.

Although the positive electrode 7004 and the negative electrode 7006 can be formed in a manner similar to that of the positive electrode and the negative electrode of the coin-type lithium secondary battery described above, the difference lies in that, since the positive electrode and the negative electrode of the cylindrical lithium secondary battery are wound, active materials are formed on both sides of the current collectors. The use of the positive electrode described in Embodiment 1 or 2 for the positive electrode 7004 enables the secondary battery with high capacity per unit volume to be manufactured. A positive electrode terminal (positive electrode current collecting lead) 7003 is connected to the positive electrode 7004, and a negative electrode terminal (negative electrode current collecting lead) 7007 is connected to the negative electrode 7006. Both the positive electrode terminal 7003 and the negative electrode terminal 7007 can be formed using a metal material such as aluminum. The positive electrode terminal 7003 and the negative electrode terminal 7007 are resistance-welded to a safety valve mechanism 7012 and the bottom of the battery can 7002, respectively. The safety valve mechanism 7012 is electrically connected to the positive electrode cap 7001 through a positive temperature coefficient (PTC) element 7011. The safety valve mechanism 7012 cuts off electrical connection between the positive electrode cap 7001 and the positive electrode 7004 when the internal pressure of the battery exceeds a predetermined threshold value. Further, the PTC element 7011, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

Note that in this embodiment, the coin-type lithium secondary battery and the cylindrical lithium secondary battery are given as examples of the lithium secondary battery; however, any of lithium secondary batteries with a variety of shapes, such as a sealed lithium secondary battery and a square-type lithium secondary battery, can be used. Further, a structure in which a plurality of positive electrodes, a plurality of negative electrodes, and a plurality of separators are stacked or wound may be employed.

This embodiment can be implemented in combination with any of the other embodiments as appropriate.

Embodiment 4

The lithium secondary battery of one embodiment of the present invention can be used for power supplies of a variety of electric appliances and electronic devices which can operate by electric power.

Specific examples of electrical appliances and electronic devices each utilizing the lithium secondary battery of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, portable wireless devices, cellular phones, car phones, portable game machines, calculators, portable information terminals, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, tools such as chain saws, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by electric motors using electric power from the lithium secondary batteries are also included in the category of electrical appliances and electronic devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the electric appliances and electronic devices, the lithium secondary battery of one embodiment of the present invention can be used as a main power supply for supplying enough electric power for almost the whole power consumption. Alternatively, in the electric appliances and electronic devices, the lithium secondary battery of one embodiment of the present invention can be used as an uninterruptible power supply which can supply electric power to the electric appliances and electronic devices when the supply of electric power from the main power supply or a commercial power supply is stopped. Still alternatively, in the electric appliances and electronic devices, the lithium secondary battery of one embodiment of the present invention can be used as an auxiliary power supply for supplying electric power to the electric appliances and electronic devices at the same time as the power supply from the main power supply or a commercial power supply.

Figure 5:
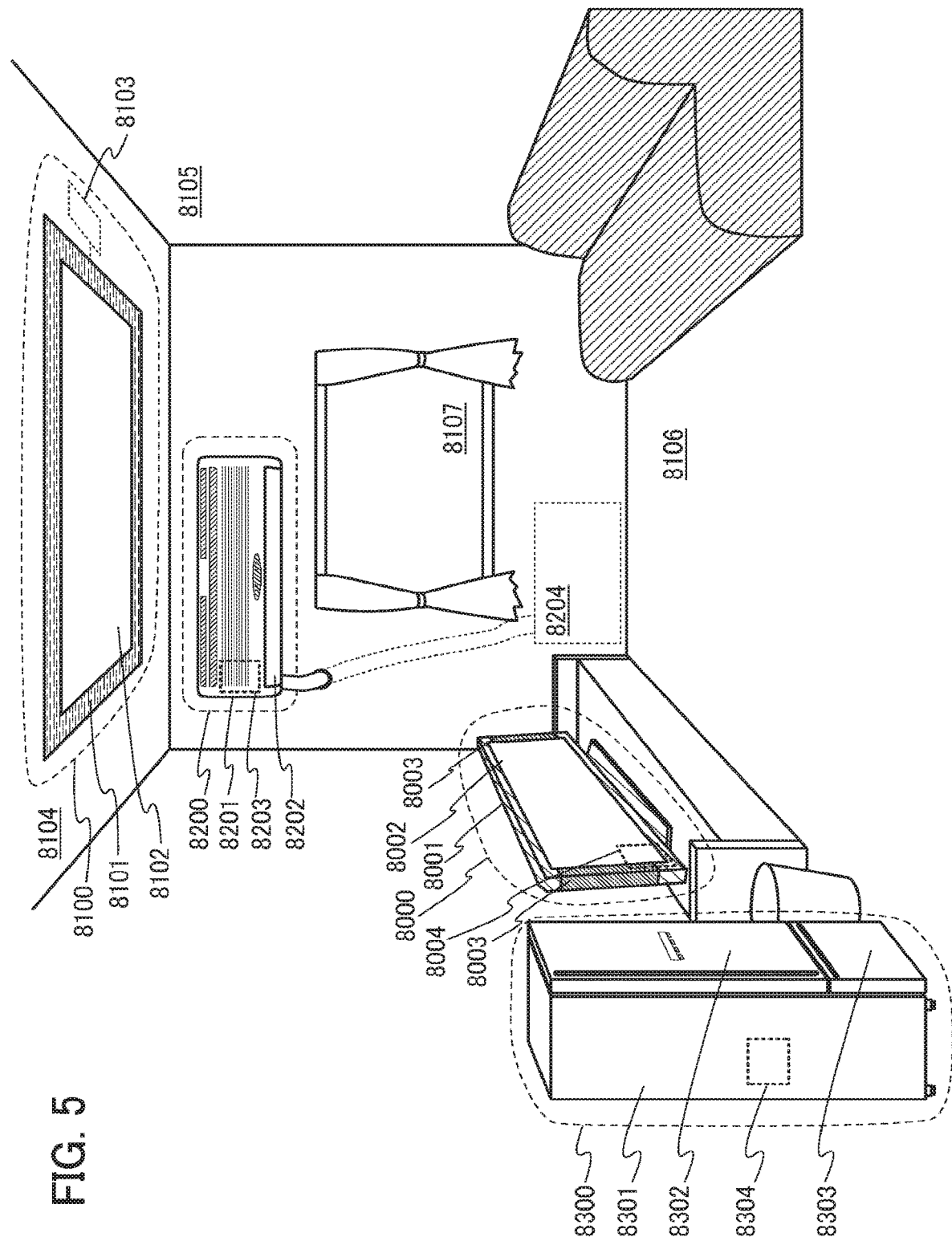
FIG. 5 illustrates electronic devices.

FIG. 5 illustrates specific structures of the electric appliances and electronic devices. In FIG. 5, a display device 8000 is an example of an electronic device including a lithium secondary battery 8004 of one embodiment of the present invention. Specifically the display device 8000 corresponds to a display device for TV broadcast reception and includes a housing 8001, a display portion 8002, speaker portions 8003, and the lithium secondary battery 8004. The lithium secondary battery 8004 of one embodiment of the present invention is provided in the housing 8001. The display device 8000 can receive electric power from a commercial power supply. Alternatively, the display device 8000 can use electric power stored in the lithium secondary battery 8004. Thus, the display device 8000 can be operated with the use of the lithium secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 5, an installation lighting device 8100 is an example of an electric appliance including a lithium secondary battery 8103 of one embodiment of the present invention. Specifically, the lighting device 8100 includes a housing 8101, a light source 8102, and a lithium secondary battery 8103. Although FIG. 5 illustrates the case where the lithium secondary battery 8103 is provided in a ceiling 8104 on which the housing 8101 and the light source 8102 are installed, the lithium secondary battery 8103 may be provided in the housing 8101. The lighting device 8100 can receive electric power from a commercial power supply. Alternatively, the lighting device 8100 can use electric power stored in the lithium secondary battery 8103. Thus, the lighting device 8100 can be operated with the use of the lithium secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 5 as an example, the lithium secondary battery of one embodiment of the present invention can be used in an installation lighting device provided in, for example, a wall 8105, a floor 8106, a window 8107, or the like other than the ceiling 8104. Alternatively, the lithium secondary battery can be used in a tabletop lighting device or the like.

As the light source 8102, an artificial light source which emits light artificially by using electric, power can be used. Specifically, an incandescent lamp, a discharge lamp such as a fluorescent lamp, and light-emitting elements such as an LED and an organic EL element are given as examples of the artificial light source.

In FIG. 5, an air conditioner including an indoor unit 8200 and an outdoor unit 8204 is an example of an electric appliance including a lithium secondary battery 8203 of one embodiment of the invention. Specifically, the indoor unit 8200 includes a housing 8201, an air outlet 8202, and a lithium secondary battery 8203. Although FIG. 5 illustrates the case where the lithium secondary battery 8203 is provided in the indoor unit 8200, the lithium secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the lithium secondary battery 8203. Particularly in the case where the secondary batteries 8203 are provided in both the indoor unit 8200 and the outdoor unit 8204, the air conditioner can be operated with the use of the lithium secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 5 as an example, the lithium secondary battery of one embodiment of the present invention can be used in an air conditioner in which the functions of an indoor unit and an outdoor unit are integrated in one housing.

In FIG. 5, an electric refrigerator-freezer 8300 is an example of an electric appliance including a lithium secondary battery 8304 of one embodiment of the present invention. Specifically, the electric refrigerator-freezer 8300 includes a housing 8301, a door for a refrigerator 8302, a door for a freezer 8303, and the lithium secondary battery 8304. The lithium secondary battery 8304 is provided in the housing 8301 in FIG. 5. The electric refrigerator-freezer 8300 can receive electric power from a commercial power supply. Alternatively, the electric refrigerator-freezer 8300 can use electric power stored in the lithium secondary battery 8304. Thus, the electric refrigerator-freezer 8300 can be operated with the use of the lithium secondary battery 8304 of one embodiment of the present invention as an uninterruptible power supply, even when electric power cannot be supplied from a commercial power supply due to power failure or the like.

Note that among the electric appliances and electronic devices described above, a high-frequency heating apparatus such as a microwave oven and an electric appliance such as an electric rice cooker require high power in a short time. The tripping of a breaker of a commercial power supply in use of an electric appliance can be prevented by using the lithium secondary battery of one embodiment of the present invention as an auxiliary power supply for supplying electric power which cannot be supplied enough by a commercial power supply.

In addition, in a time period when electric appliances and electronic devices are not used, particularly when the proportion of the amount of electric power which is actually used to the total amount of electric power which can be supplied from a commercial power supply source (such a proportion referred to as a usage rate of electric power) is low, electric power can be stored in the lithium secondary battery, whereby the usage rate of electric power can be reduced in a time period when the electric appliances and electronic devices are used. For example, in the case of the electric refrigerator-freezer 8300, electric power can be stored in the lithium secondary battery 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the lithium secondary battery 8304 is used as an auxiliary power supply; thus, the usage rate of electric power in daytime can be reduced.

This embodiment can be implemented in combination with any of the other embodiments as appropriate.

Embodiment 5

Next, a portable information terminal which is an example of electronic devices will be described with reference to FIGS. 6A to 6C.

FIGS. 6A and 6B illustrate a tablet terminal which can be folded. FIG. 6A illustrates the tablet terminal in the state of being unfolded. The tablet terminal includes a housing 9630, a display portion 9631*a*, a display portion 9631*b*, a display-mode switching button 9034, a power button 9035, a power-saving-mode switching button 9036, a fastener 9033, and an operation button 9038.

A touch panel area 9632*a* can be provided in part of the display portion 9631*a*, in which area, data can be input by touching displayed operation keys 9638. Note that half of the display portion 9631*a* has only a display function and the other half has a touch panel function. However, the structure of the display portion 9631*a* is not limited to this, and all the area of the display portion 9631*a* may have a touch panel function. For example, a keyboard can be displayed on the whole display portion 9631*a* to be used as a touch panel, and the display portion 9631*b* can be used as a display screen.

A touch panel area 9632*b* can be provided in part of the display portion 9631*b* like in the display portion 9631*a*. When a keyboard display switching button 9639 displayed on the touch panel is touched with a finger, a stylus, or the like, a keyboard can be displayed on the display portion 9631*b*.

The touch panel area 9632*a* and the touch panel area 9632*b* can be controlled by touch input at the same time.

The display-mode switching button 9034 allows switching between a landscape mode and a portrait mode, color display and black-and-white display, and the like. The power-saving-mode switching button 9036 allows optimizing the display luminance in accordance with the amount of external light in use which is detected by an optical sensor incorporated in the tablet terminal. In addition to the optical sensor, other detecting devices such as sensors for determining inclination, such as a gyroscope or an acceleration sensor, may be incorporated in the tablet terminal.

Although the display area of the display portion 9631*a* is the same as that of the display portion 9631*b* in FIG. 6A, one embodiment of the present invention is not particularly limited thereto. The display area of the display portion 9631*a* may be different from that of the display portion 9631*b*, and further, the display quality of the display portion 9631*a* may be different from that of the display portion 9631*b*. For example, one of the display portions 9631*a* and 9631*b* may display higher definition images than the other.

FIG. 6B illustrates the tablet terminal in the state of being closed. The tablet terminal includes the housing 9630, a solar cell 9633, a charge/discharge control circuit 9634, a battery 9635, and a DC-DC converter 9636. FIG. 6B illustrates an example where the charge/discharge control circuit 9634 includes the battery 9635 and the DC-DC converter 9636. The lithium secondary battery described in the above embodiment is used as the battery 9635.

Since the tablet terminal can be folded, the housing 9630 can be closed when the tablet terminal is not in use. Thus, the display portions 9631*a* and 9631*b* can be protected, which permits the tablet terminal to have high durability and improved reliability for long-term use.

The tablet terminal illustrated in FIGS. 6A and 6B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on a surface of the tablet terminal, can supply electric power to a touch panel, a display portion, an image signal processor, and the like. Note that the solar cell 9633 can be provided on one or both surfaces of the housing 9630 and thus the battery 9635 can be charged efficiently. The use of the lithium secondary battery of one embodiment of the present invention as the battery 9635 has advantages such as a reduction in size.

The structure and operation of the charge/discharge control circuit 9634 illustrated in FIG. 6B will be described with reference to a block diagram of FIG. 6C. FIG. 6C illustrates the solar cell 9633, the battery 9635, the DC-DC converter 9636, a converter 9637, switches SW1 to SW3, and the display portion 9631. The battery 9635, the DC-DC converter 9636, the converter 9637, and the switches SW1 to SW3 correspond to the charge and discharge control circuit 9634 in FIG. 6B.

First, an example of operation in the case where electric power is generated by the solar cell 9633 using external light will be described. The voltage of electric power generated by the solar cell is raised or lowered by the DC-DC converter 9636 so that the electric power has a voltage for charging the battery 9635. When the display portion 9631 is operated with the electric power from the solar cell 9633, the switch SW1 is turned on and the voltage of the electric power is raised or lowered by the converter 9637 to a voltage needed for operating the display portion 9631. In addition, when display on the display portion 9631 is not performed, the switch SW1 is turned off and the switch SW2 is turned on so that the battery 9635 may be charged.

Although the solar cell 9633 is described as an example of a power generation means, there is no particular limitation on the power generation means, and the battery 9635 may be charged with any of the other means such as a piezoelectric element or a thermoelectric conversion element (Peltier element). For example, the battery 9635 may be charged with a non-contact power transmission module capable of performing charging by transmitting and receiving electric power wirelessly (without contact), or any of the other charge means used in combination.

It is needless to say that one embodiment of the present invention is not limited to the electronic device illustrated in FIGS. 6A to 6C as long as the electronic device is equipped with the lithium secondary battery described in the above embodiment.

Embodiment 6

Further, an example of the moving object which is an example of the electrical appliance and electronic devices will be described with reference to FIGS. 7A and 7B.

Any of the lithium secondary batteries described in Embodiments 1 to 3 can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 7A:
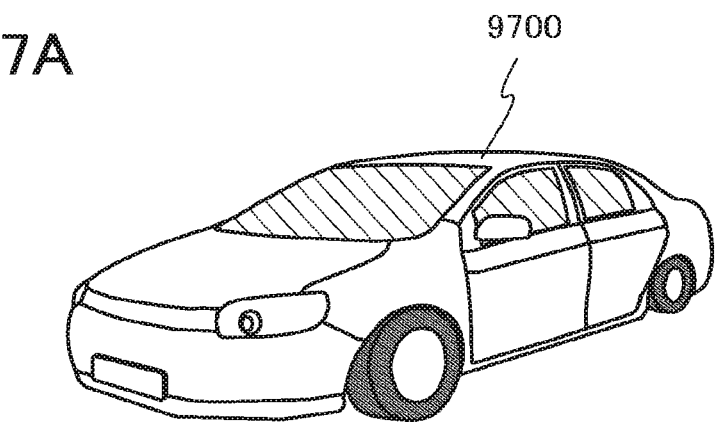
FIGS. 7A and 7B illustrate an electronic device.
Figure 7B:
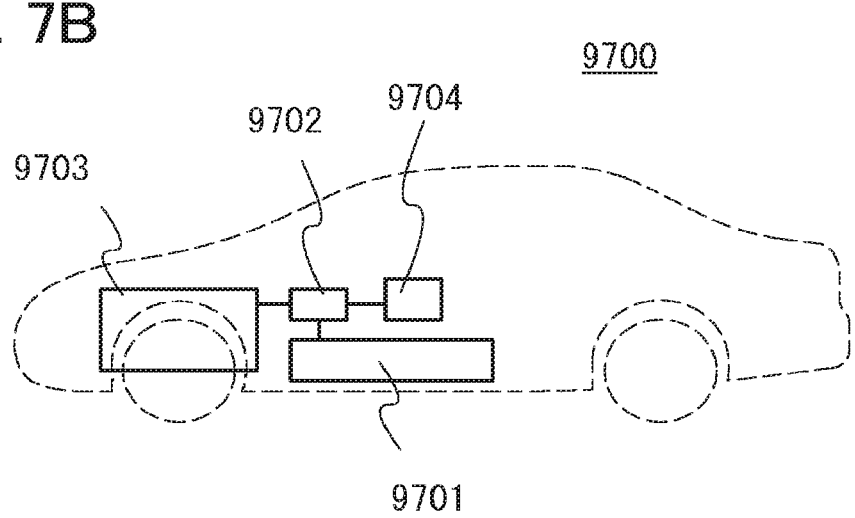

FIGS. 7A and 7B illustrate an example of an electric vehicle. An electric vehicle 9700 is equipped with a lithium secondary battery 9701. The output of the electric power of the lithium secondary battery 9701 is adjusted by a control circuit 9702 and the electric power is supplied to a driving device 9703. The control circuit 9702 is controlled by a processing unit 9704 including a ROM, a RAM, a CPU, or the like which is not illustrated.

The driving device 9703 includes a DC motor or an AC motor either alone or in combination with an internal combustion engine. The processing unit 9704 outputs a control signal to the control circuit 9702 based on input data such as data on operation (e.g., acceleration, deceleration, or stop) of a driver or data during driving (e.g., data on an upgrade or a downgrade, or data on a load on a driving wheel) of the electric vehicle 9700. The control circuit 9702 adjusts the electric energy supplied from the lithium secondary battery 9701 in accordance with the control signal of the processing unit 9704 to control the output of the driving device 9703. In the case where the AC motor is mounted, although not illustrated, an inverter which converts direct current into alternate current is also incorporated.

The lithium secondary battery 9701 can be charged by external electric power supply using a plug-in technique. For example, the lithium secondary battery 9701 is charged through a power plug from a commercial power supply. The lithium secondary battery 9701 can be charged by converting the supplied power into DC constant voltage having a predetermined voltage level through a converter such as an AC-DC converter. The use of the lithium secondary battery of one embodiment of the present invention as the lithium secondary battery 9701 can be conducive to a reduction in charging time, leading to an improvement in convenience. Moreover, the higher charging and discharging rate of the lithium secondary battery 9701 can contribute to greater acceleration and excellent performance of the electric vehicle 9700. When the lithium secondary battery 9701 itself can be more compact and more lightweight as a result of improved characteristics of the lithium secondary battery 9701, the vehicle can be lightweight, leading to an increase in fuel efficiency.

This embodiment can be implemented in combination with any of the other embodiments as appropriate.

Example 1

In this example, polyarylamine was used as a polymer having a functional group as a side chain, and a positive electrode was formed using, as a binder, a reaction mixture where polyarylamine and reduced graphene oxide were covalently bonded to each other. Then, the positive electrode was evaluated using metallic lithium as a negative electrode.

Formation of Positive Electrode

Polymer Having Functional Group on Side Chain

Polyarylamine whose weight-average molecular weight is approximately 15000 (PAA-15C manufactured by NIT-TOBO MEDICAL CO., LTD.) was used.

Graphene Oxide

Graphene oxide was prepared by a modified Hummers method. Specifically a sulfuric acid solution of potassium permanganate, hydrogen peroxide water, or the like was added to single crystal graphite powder to cause oxidation reaction; thus, a dispersion containing graphene oxide was formed.

Lithium Iron Phosphate

Next, lithium iron phosphate was prepared. To prepare lithium iron phosphate, first, lithium carbonate ($Li_2CO_3$), iron (II) oxalate dihydrate ($FeC_2O_4.2H_2O$), and ammonium dihydrogen phosphate ($NH_4H_2PO_4$) as raw materials of lithium iron phosphate were weighed so that Li:Fe:P is 1:1:1 in a molar ratio, and were mixed with first ball mill treatment. Note that lithium carbonate is a raw material for introducing lithium, iron (II) oxalate dihydrate is a raw material for introducing iron, and ammonium dihydrogen phosphate is a raw material for introducing phosphate. In this example, as raw materials of the lithium iron phosphate, lithium carbonate, iron (II) oxalate dihydrate, and ammonium dihydrogen phosphate whose impurity element concentrations were reduced were used.

The first ball mill treatment was performed in such a manner that acetone was added as a solvent and a ball mill with a ball diameter of $\phi 3$ mm was rotated at 300 rpm for 2 hours. Note that a ball mill pot (cylindrical container) and a ball which were made of zirconia were used.

Then, the powder mixture was subjected to first heat treatment (pre-baking). The first heat treatment was performed at 350° C. for 10 hours with the powder mixture placed in a nitrogen atmosphere.

After the first heat treatment, the baked product was ground in a mortar. Then, the baked product which was ground was further ground with second ball mill treatment.

The second ball mill treatment was performed in such a manner that acetone was added as a solvent, and a hall mill with a ball diameter of $\phi 3$ mm was rotated at 300 rpm for 2 hours.

Then, the powder mixture was subjected to second heat treatment (main baking). The second heat treatment was performed at 600° C. for 1 hour with the powder mixture placed in a nitrogen atmosphere.

After the second heat treatment, the baked product was ground in a mortar.

Formation of Positive Electrode Active Material Layer

The lithium iron phosphate powder and the graphene oxide powder which were prepared in the above manner and polyarylamine were weighed so that the weight ratio of lithium iron phosphate:graphene oxide:polyarylamine was 97.822:2.104:0.074.

Then, water was added to the lithium iron phosphate and the graphene oxide and wet mixing was performed using a rotary and revolutionary mixer at 2000 rpm.

After that, a 0.153 wt % aqueous solution of the polyarylamine was prepared and mixed into the mixture of the lithium iron phosphate and the graphene oxide to form a slurry.

After water was added to the slurry to adjust the viscosity, the slurry was applied to a current collector made of aluminum foil and dried by heating at 50° C., so that a positive electrode active material layer was formed over the current collector. Then, the current collector and the positive electrode active material layer were heated at 170° C. for 10 hours to reduce the graphene oxide to form reduced graphene oxide, so that a positive electrode of this example was formed.

Characteristics of Secondary Batteries

Secondary batteries were each fabricated using the positive electrode formed through the above steps. As a cell, a base cell manufactured by NIPPON TOMUSERU K.K. was used. As a negative electrode, metallic lithium was used. An electrolyte was formed in such a manner that diethyl carbonate (DEC) and a solution in which lithium hexafluorophosphate was dissolved at a concentration of 1.0 mol/L, in ethylene carbonate ($LiPF_6$ EC) were mixed at a volume ratio of $LiPF_6$ EC:DEC=1:1. As a separator, polypropylene was used.

The constant-current charge-discharge characteristics of the fabricated secondary batteries were evaluated under the following conditions. The conditions for charging were as follows: the charge rate was 0.2 C (CCCV), the upper limit voltage was 43 V, and the lower limit current value in CV charging was 0.01 C, and the condition for discharging was as follows: the discharge rate was 0.2 C (CC).

Figure 8A:
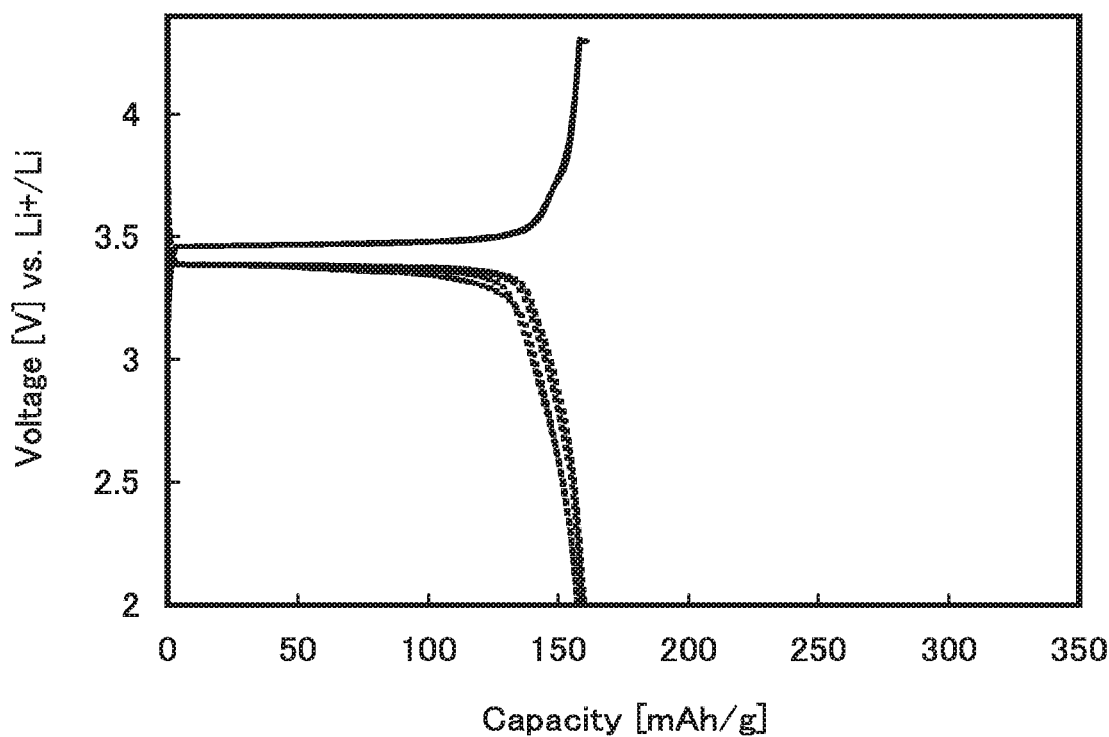
FIGS. 8A and 8B each show charge-discharge characteristics in Example 1.
Figure 8B:
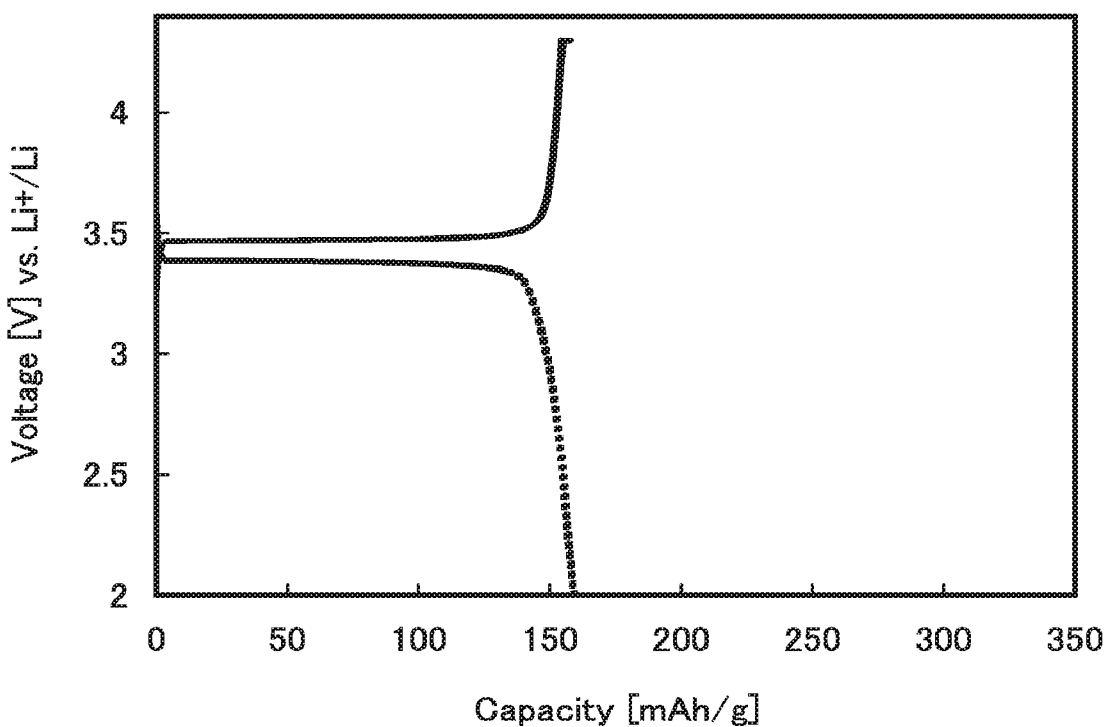

FIGS. 8A and 8B show obtained charge-discharge curves of the two secondary batteries fabricated and evaluated under the same conditions. The vertical axis represents voltage, and the horizontal axis represents capacity. In the graphs, solid curves are charge curves, and dotted curves are discharge curves.

In both the graphs of the two secondary batteries in FIGS. 8A and 8B, wide plateaus are observed, showing that the positive electrodes of this example were normally charged and discharged.

Comparative Example 1

In this comparative example, a positive electrode was formed using a binder formed using only reduced graphene oxide. Then, the positive electrode was evaluated using metallic lithium as a negative electrode.

Formation of Positive Electrode

Formation of Positive Electrode Active Material Layer

Graphene oxide powder and lithium iron phosphate powder were prepared as in Example 1 and weighed so that the weight ratio of lithium iron phosphate:graphene oxide was 95:5.

Then, water was added to the lithium iron phosphate and the graphene oxide and wet mixing was performed using a rotary and revolutionary mixer at 2000 rpm, so that a slurry was formed.

After that, as in Example 1, the slurry was applied to a current collector to form a positive electrode active material layer and the current collector and the positive electrode active material layer were dried and subjected to reduction treatment, so that a positive electrode of this comparative example was formed.

Characteristics of Secondary Batteries

Figure 9A:
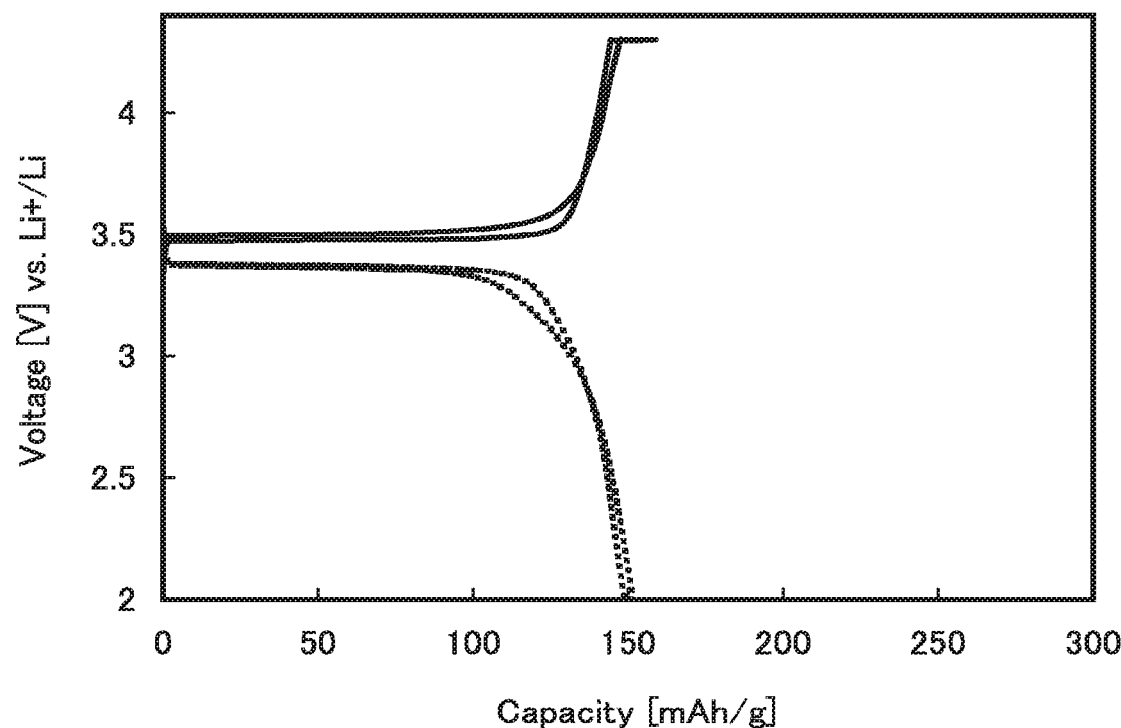
FIGS. 9A and 9B each show charge-discharge characteristics in Comparative Example 1.
Figure 9B:
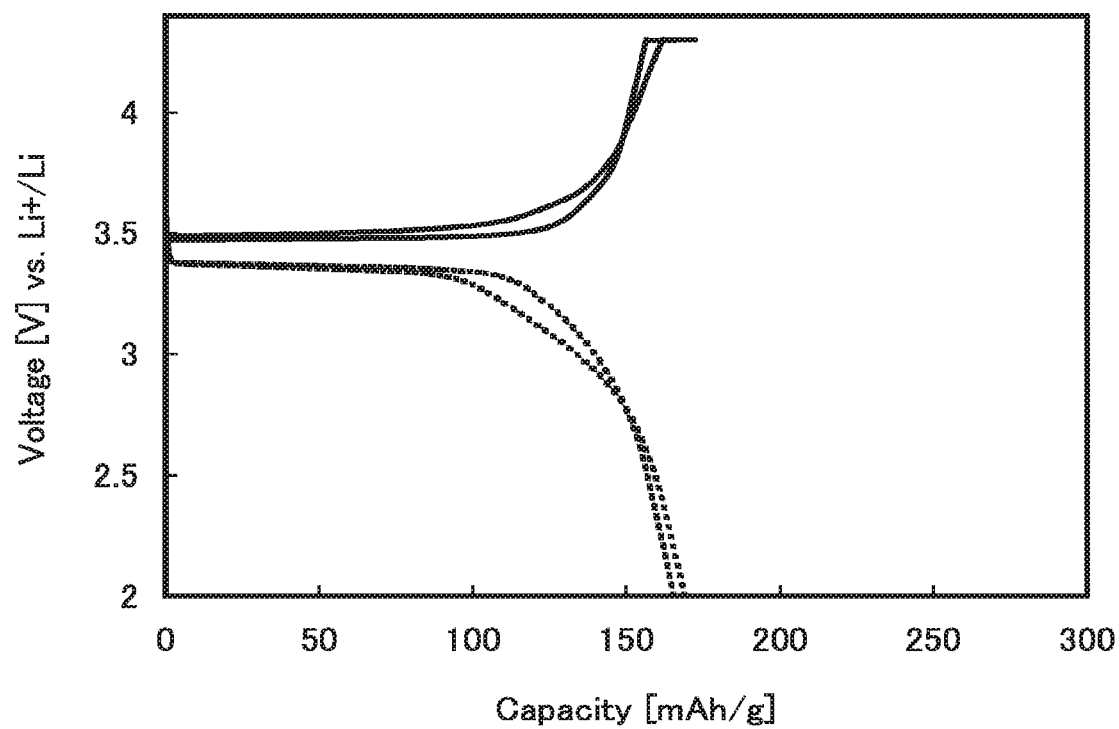

The charge-discharge characteristics were evaluated as in Example 1. FIGS. 9A and 9B show charge-discharge curves of two secondary batteries fabricated and evaluated under the same conditions. In the graphs, solid curves are charge curves, and dotted curves are discharge curves.

In both the graphs of the two secondary batteries in FIGS. 9A and 9B, plateaus are observed, showing that the positive electrodes of this comparative example were normally charged and discharged.

Figure 10:
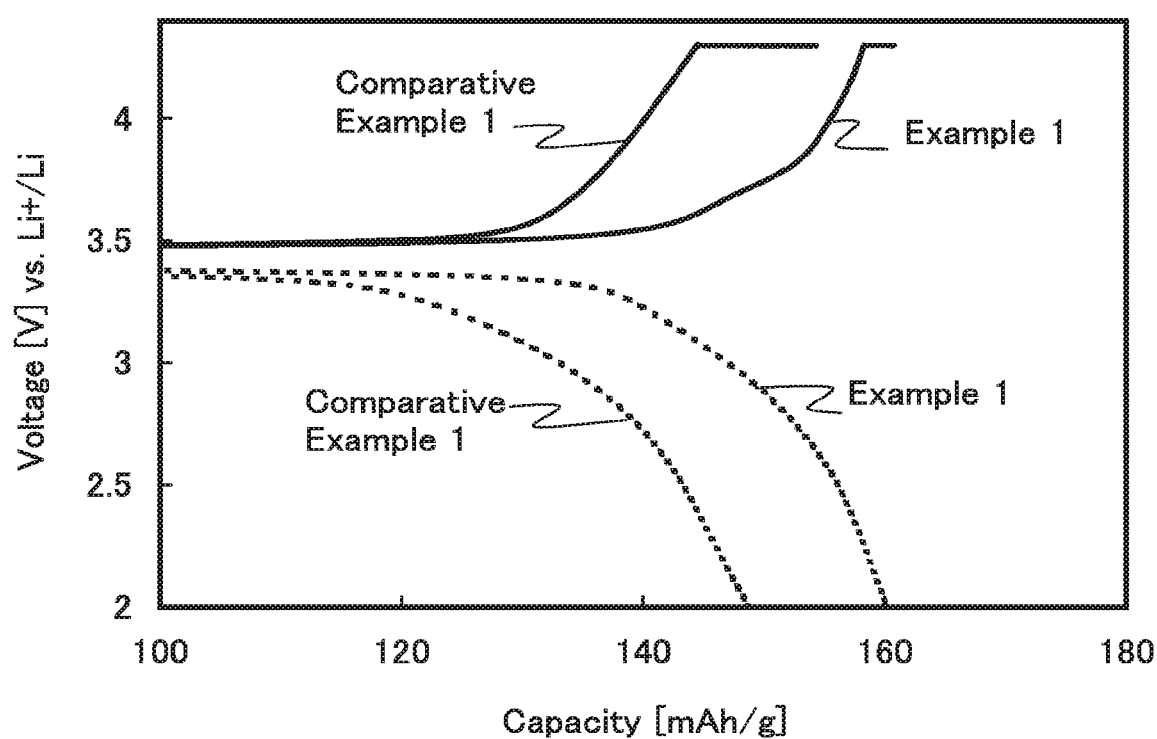
FIG. 10 shows comparisons of charge-discharge characteristics between Example 1 and Comparative Example 1.

FIG. 10 shows the comparison of the charge-discharge curves in FIG. 8A of Example 1 and the charge-discharge curves in FIG. 9A of Comparable Example 1. In the graphs, solid curves are charge curves, and dotted curves are discharge curves. The vertical axis represents voltage, and the horizontal axis represents capacity and is enlarged to show the range from 100 mAh/g to 180 mAh/g.

In FIG. 10, the curves of the positive electrode in Example 1 have wider plateaus than those of the positive electrode of Comparative Example 1.

The above comparison between Example 1 and Comparative Example 1 indicates that the use of the reaction mixture where the polymer having the functional group as a side chain and the reduced graphene oxide were bonded to each other as a binder led to wider plateaus on the charge-discharge curves, that is, improvements in charge-discharge characteristics.

Example 2

In this example, a positive electrode was formed using, as a binder, a reaction mixture where reduced graphene oxide and a polymer were covalently bonded to each other. The positive electrode was evaluated using graphite as a negative electrode.

Formation of Positive Electrode

A positive electrode was formed as in Example 1. The thickness of a positive electrode active material layer was 25 μm, the weight of a positive electrode active material was 5.69 mg, and the density of the electrode was 2.06 g/cm³.

Characteristics of Secondary Battery

Secondary batteries were each fabricated using the positive electrode formed through the above steps. As a cell, a base cell manufactured by NIPPON TOMUSERU K.K. was used.

For a negative electrode, graphite was used. Specifically, a mixture in which graphite (mesocarbon microbeads (MCMB) with a grain diameter of 9 μm), acetylene black (AB), and polyvinylidene difluoride (PVDF) were mixed at a weight ratio of graphite:AB:PVDF=93:2:5 was used. The thickness of a negative electrode active material layer was 62 μm, the weight of a negative electrode active material was 11.2 mg, and the density of the electrode was 1.54 g/cm³.

An electrolyte was formed in such a manner that diethyl carbonate (DEC) and a solution in which lithium phosphate hexafluoride was dissolved at a concentration of 1.0 mol/L in ethylene carbonate ($LiPF_6$ EC) were mixed at a volume ratio of $LiPF_6$ EC:DEC=1:1. As a separator, polypropylene was used.

The constant-current charge-discharge characteristics of the fabricated secondary battery was evaluated under the following conditions. The conditions for charging were as follows: the charge rate was 0.2 C (CCCV), the upper limit voltage was 4.3 V, and the lower limit of a current value in CV charging was 0.01 C, and the condition for discharging was as follows: the discharge rate was 0.2 C (CC).

Figure 11:
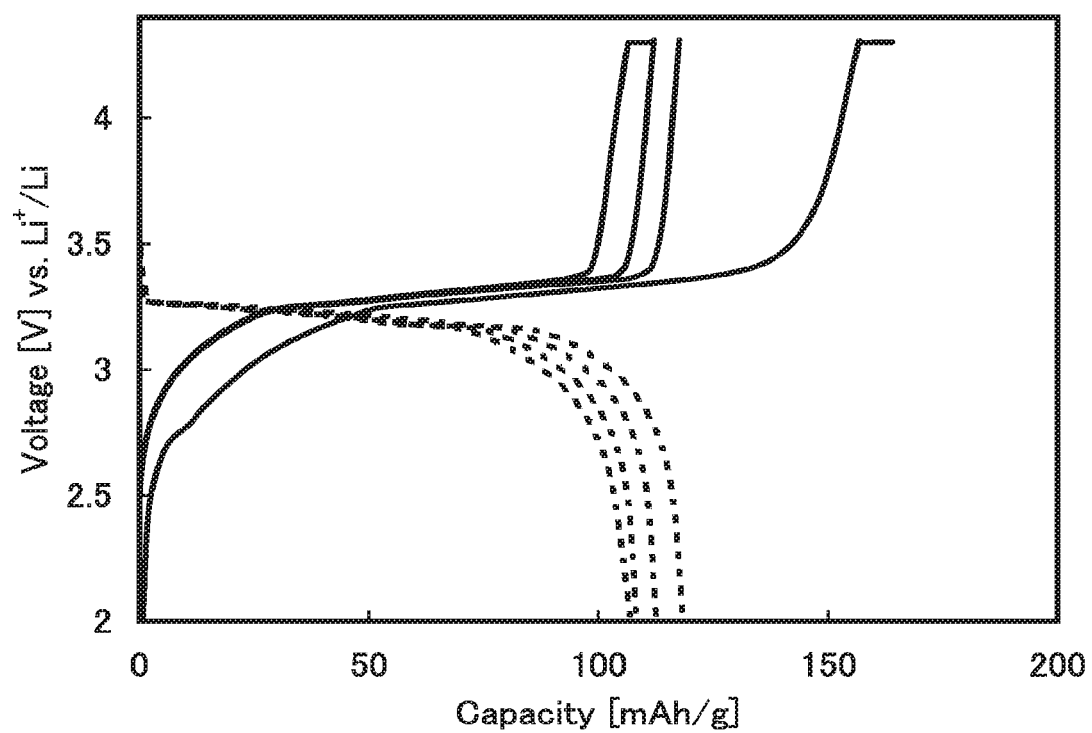
FIG. 11 shows charge-discharge characteristics in Example 2.

FIG. 11 shows obtained charge-discharge curves. The vertical axis represents voltage, and the horizontal axis represents capacity. In the graphs, solid curves are charge curves, and dotted curves are discharge curves.

FIG. 11 shows that even when graphite was used for the negative electrode, the positive electrode formed using, as a binder, the reaction mixture where the polymer having the functional group as a side chain and the reduced graphene were bonded to each other was normally charged and discharged.

Example 3

In this example, a reaction mixture where polyarylamine and graphene oxide were bonded to each other was prepared, and the bond between the polyarylamine and the graphene oxide was evaluated.

Formation of Reaction Mixture

Water was added to 200 mg of graphene oxide prepared as in Example 1 to form an aqueous dispersion containing the graphene oxide. Then, 1 g of a 1.5% polyarylamine aqueous solution was added to the aqueous dispersion to form a brown precipitate. The precipitate was collected by filtration, washed with water, and dried under reduced pressure, so that the reaction mixture was formed.

FT-IR

Figure 12:
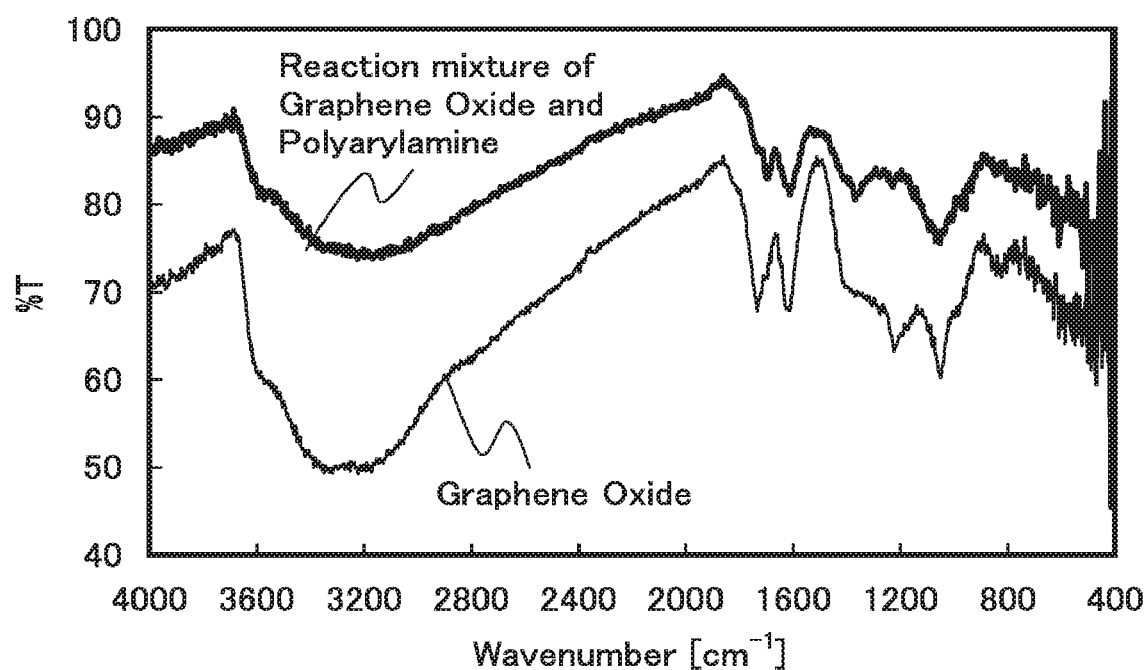
FIG. 12 shows FT-IR measurement results in Example 3.
Figure 13:
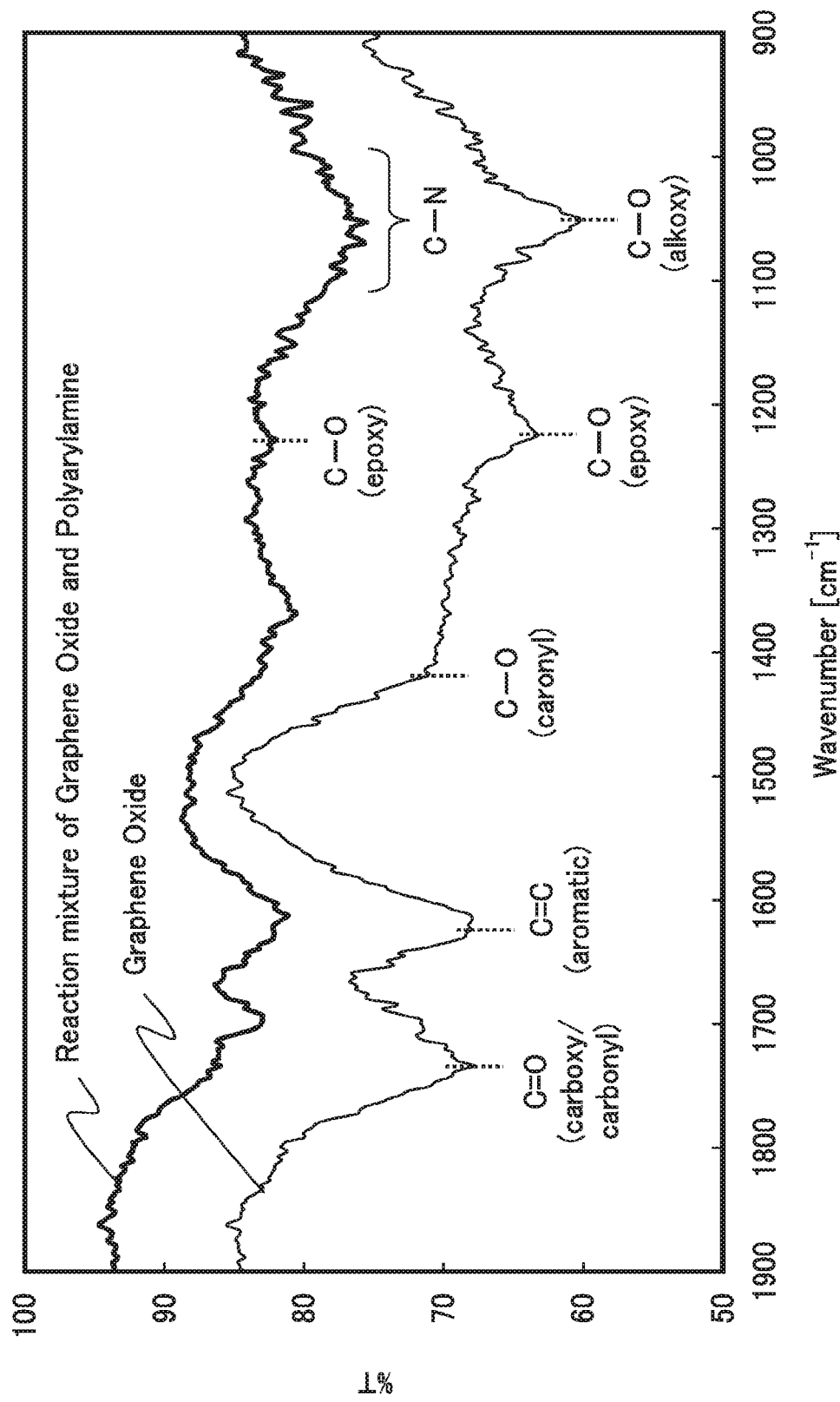
FIG. 13 shows FT-IR measurement results in Example 3.

FIGS. 12 and 13 show FT-IR spectra of the formed reaction mixture of the graphene oxide and the polyarylamine, and the graphene oxide, a raw material of the reaction mixture. IR spectra were measured by a potassium bromide (KBr) pellet method. The horizontal axis represents wavenumber and the vertical axis represents transmittance. FIG. 12 shows spectra in the range from 400 $cm^{-1}$ to 4000 $cm^{-1}$, and FIG. 13 shows enlarged spectra of the range from 900 $cm^{-1}$ to 1900 $cm^{-1}$ in FIG. 12 where the difference between the spectra of the reaction mixture and the graphene oxide was significant. FIG. 13 shows assignment of peaks representing infrared absorption of the spectra.

The amount of infrared absorption assigned from an epoxy group in the reaction mixture is much smaller than that in the graphene oxide. This suggests that the reaction mixture contains a smaller amount of epoxy groups than the graphene oxide.

Further, the spectrum of the reaction mixture has a broader peak representing infrared absorption at around 1050 $cm^{-1}$ than that of the graphene oxide. This broad region presumably includes infrared absorption assigned from a C—N bond.

These results imply that the graphene oxide and the polyarylamine were C—N bonded owing to the epoxy group in the graphene oxide and an amino group in the polyarylamine.

Example 4

In this example, graphene oxide was reduced to form reduced graphene oxide, and the reduced graphene oxide was evaluated.

Preparation of Graphene Oxide

As in Example 1, graphene oxide was prepared using single crystal graphite, and the graphene oxide was applied to aluminum current collectors and dried, so that Sample 1A and Sample 1B including the graphene oxide were formed.

Reduction Graphene Oxide

Then, Sample 1A and Sample 1B including the graphene oxide were subjected to electrochemical reduction treatment and thermal reduction treatment, respectively, to form Sample 2A and Sample 2B including reduced graphene oxide.

Electrochemical Reduction

Sample 1A was subjected to the electrochemical reduction treatment to form Sample 2A. Specifically, three cycles of the electrochemical reduction treatment were performed by cyclic voltammetry at a sweep rate of 0.1 mV/s within a potential range of open circuit voltage (OCA) (3.0 V for the second cycle and the subsequent cycles) to 1.5 V.

Thermal Reduction

Sample 1B was subjected to the thermal reduction treatment to form Sample 2B. Specifically, heating was performed at 300° C. in a reduced pressure atmosphere for 10 hours.

XPS

The bonding states and elemental compositions of Samples 1A, 1B, 2A, and 2B were evaluated by S.

Bonding States

Figure 14:
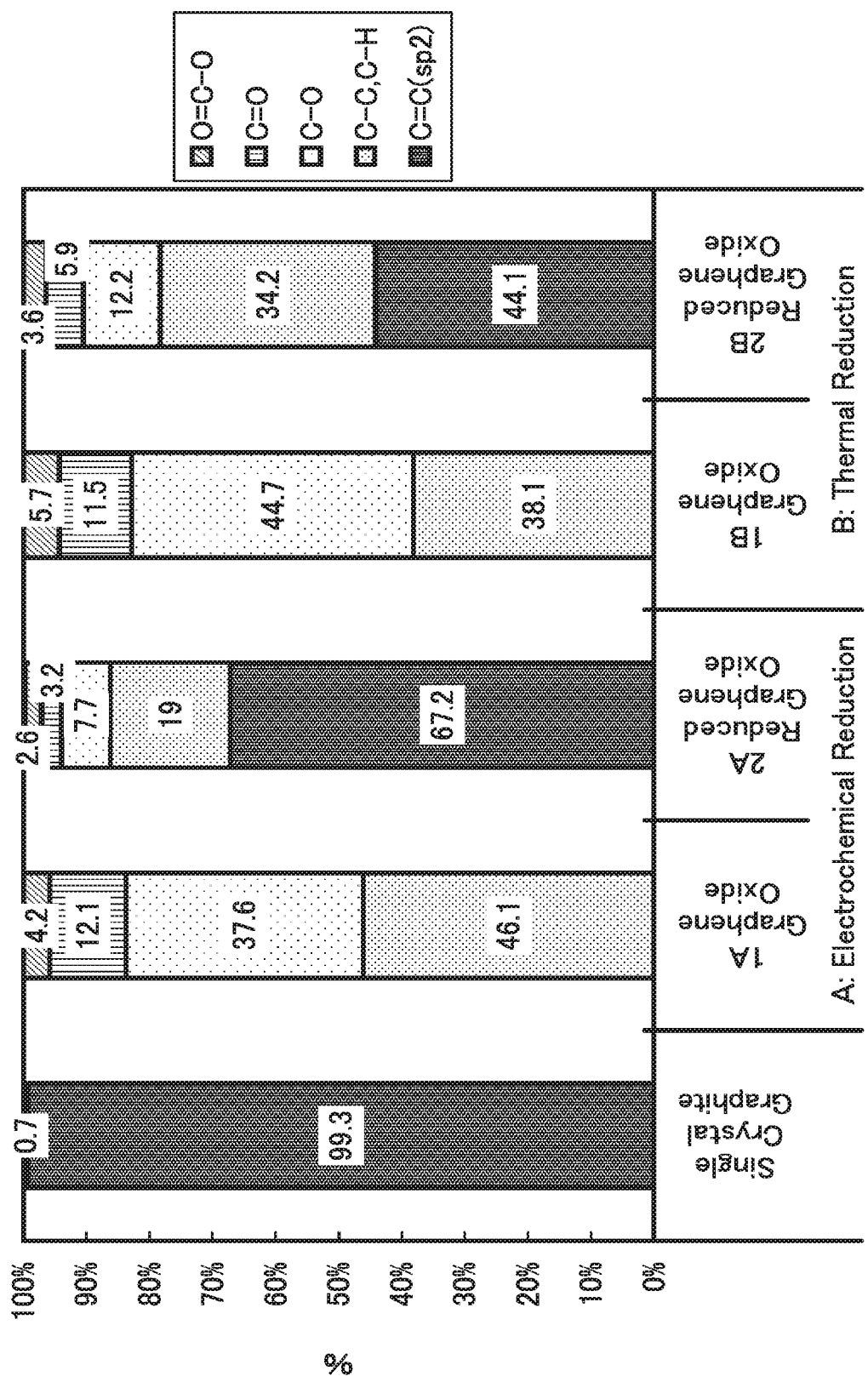
FIG. 14 shows XPS measurement results in Example 4.

FIG. 14 shows the comparison of the bonding states between the single crystal graphite, which is a raw material, Sample 1A and Sample 1B including the graphene oxide, and Sample 2A and Sample 2B including the reduced graphene oxide by XPS. The vertical axis represents the proportions of bonds (%). The proportions of the bonds were calculated by analyzing the waveforms of shifts of carbon peaks, which were obtained by XPS.

C═C bonds (also referred to as π bonds of carbon atoms, or $sp^2$ orbitals) accounted for 99.3% in the single crystal graphite.

Sample 1A and Sample 1B including the graphene oxide did not contain C═C bonds but contained O═C—O bonds, C—O bonds, C—O bonds, C—C bonds, and C—H bonds. This suggests that C═C bonds were lost from most of carbon atoms in graphene by oxidation.

In contrast, both Sample 2A and Sample 2B including the graphene oxide reduced by electrochemical reduction and thermal reduction, respectively, contained C═C bonds. The proportion of C═C bonds with respect to the total number of O═C—O bonds, C═O bonds, C—O bonds, C—C bonds, C—H bonds, and C═C bonds was greater than or equal to 44.1%. This implies that C═C bonds were formed between carbon atoms in the graphene oxide by the reduction treatment.

The above results reveal that it is possible to form C═C bonds (π bonds of carbon atoms) in graphene oxide by either electrochemical reduction or thermal reduction. That is to say, the reduced graphene oxide can be referred to as graphene oxide containing C═C bonds. The reduced graphene oxide can also be referred to as graphene oxide in which the proportion of C═C bonds with respect to the total number of O═C—O bonds, C—O bonds, C—O bonds, C—C bonds, C—H bonds, and C=C bonds is greater than or equal to 5%, greater than or equal to 10%, or greater than or equal to 30%.

Elemental Composition

Figure 15:
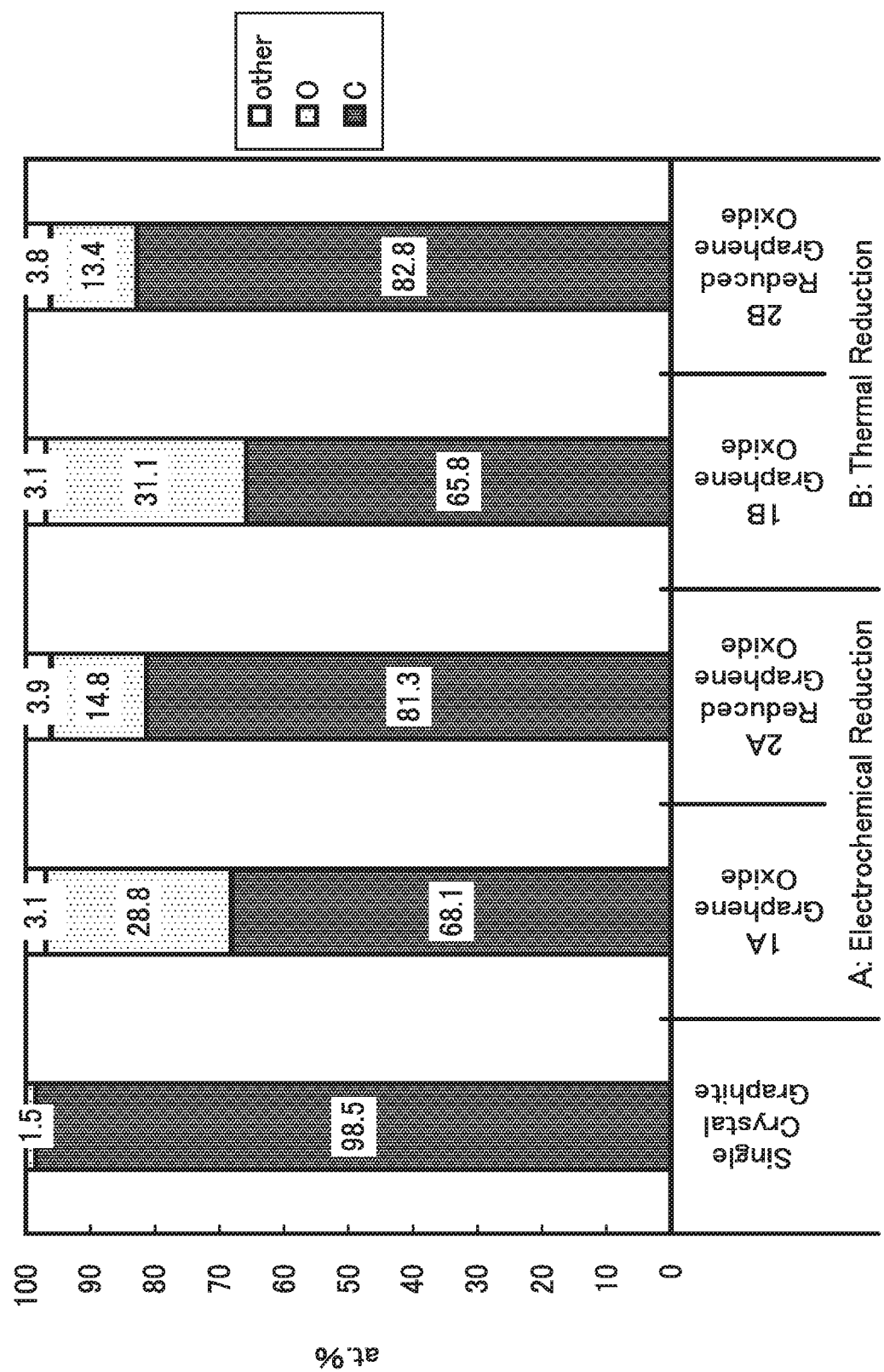
FIG. 15 shows XPS measurement results in Example 4.

FIG. 15 shows the comparison of the surface elemental compositions of the same samples as those in FIG. 14 by XPS. The unit of the vertical axis is at. %.

Carbon atoms and oxygen atoms accounted for 98.5 at. % and 1.5 at. % in the single crystal graphite, respectively.

Sample 1A and Sample 1B including the graphene oxide formed by the oxidation of single crystal graphite contained many oxygen atoms, the proportion thereof being greater than or equal to 28.8 at. %.

In contrast, Sample 2A and Sample 2B including the graphene oxide reduced by electrochemical reduction and thermal reduction, respectively, each contained fewer oxygen atoms, the proportion thereof being less than or equal to 14.8 at. %.

The above results reveal that graphene oxide can be reduced so that the proportion of oxygen atoms is less than or equal to 15 at. % by either electrochemical reduction or thermal reduction. That is to say, it can be said that the proportion of oxygen atoms in the reduced graphene oxide is less than or equal to 1.5 at. %.

This application is based on Japanese Patent Application serial no. 2011-282925 filed with the Japan Patent Office on Dec. 26, 2011, the entire contents of which are hereby incorporated by reference.

What is claimed is:

1. A manufacturing method of a positive electrode for a secondary battery comprising:
   forming a slurry by using a plurality of particles of a positive electrode active material, graphene oxide, and a polymer having a functional group;
   applying the slurry to a current collector;
   drying the slurry to form a positive electrode active material layer; and
   reducing the graphene oxide in the positive electrode active material layer for forming reduced graphene oxide,
   wherein the polymer is covalently bonded with the reduced graphene oxide.

2. The manufacturing method according to claim 1, wherein the graphene oxide in the positive electrode active material layer is reduced by supplying a potential at which a reduction reaction of the graphene oxide occurs to the current collector in an electrolyte in which the current collector and a counter electrode are immersed.

3. The manufacturing method according to claim 1, wherein the graphene oxide in the positive electrode active material layer is reduced by heating.

4. The manufacturing method according to claim 1, further comprising:
   performing a surface treatment on the current collector before the application of the slurry to the current collector.

5. The manufacturing method according to claim 1, wherein the positive electrode active material comprises lithium and phosphorus, and
   wherein the positive electrode active material further comprises iron or manganese.

6. The manufacturing method according to claim 1, wherein a weight proportion of the graphene oxide with respect to total weight of the positive electrode active material, the graphene oxide, and the polymer is greater than or equal to 1 wt. % and less than or equal to 3 wt. %.

7. The manufacturing method according to claim 6, wherein the weight proportion of the graphene oxide with respect to total weight of the positive electrode active material, the graphene oxide, and the polymer is greater than or equal to 2 wt. % and less than or equal to 3 wt. %.

8. A manufacturing method of an electrode for a secondary battery comprising:
   forming a slurry by using a plurality of particles of an active material, graphene oxide, and a polymer having a functional group;
   applying the slurry to a current collector;
   drying the slurry to form an active material layer; and
   reducing the graphene oxide in the active material layer for forming reduced graphene oxide,
   wherein the polymer is covalently bonded with the reduced graphene oxide.

9. The manufacturing method according to claim 8, wherein the graphene oxide in the active material layer is reduced by supplying a potential at which a reduction reaction of the graphene oxide occurs to the current collector in an electrolyte in which the current collector and a counter electrode are immersed.

10. The manufacturing method according to claim 8, wherein the graphene oxide in the active material layer is reduced by heating.

11. The manufacturing method according to claim 8, further comprising:
    performing a surface treatment on the current collector before the application of the slurry to the current collector.

12. The manufacturing method according to claim 8, wherein a weight proportion of the graphene oxide with respect to total weight of the active material layer, the graphene oxide, and the polymer is greater than or equal to 1 wt. % and less than or equal to 3 wt. %.

13. The manufacturing method according to claim 12, wherein the weight proportion of the graphene oxide with respect to total weight of the active material layer, the graphene oxide, and the polymer is greater than or equal to 2 wt. % and less than or equal to 3 wt. %.

* * * * *